United States Patent
Gould et al.

(10) Patent No.: US 8,832,713 B2
(45) Date of Patent: *Sep. 9, 2014

(54) EVENT QUEUES

(75) Inventors: Christopher M. Gould, Leominster, MA (US); Peter J. McCann, Mason, NH (US)

(73) Assignee: EMC Corporation, Hopkinton, MA (US)

( * ) Notice: Subject to any disclaimer, the term of this patent is extended or adjusted under 35 U.S.C. 154(b) by 202 days.

This patent is subject to a terminal disclaimer.

(21) Appl. No.: 13/586,137

(22) Filed: Aug. 15, 2012

(65) Prior Publication Data

US 2013/0042001 A1   Feb. 14, 2013

Related U.S. Application Data

(63) Continuation of application No. 12/286,493, filed on Sep. 29, 2008, now Pat. No. 8,271,996.

(51) Int. Cl.
*G06F 13/00* (2006.01)
*G06F 9/54* (2006.01)

(52) U.S. Cl.
CPC .......... *G06F 9/545* (2013.01); *G06F 2209/543* (2013.01); *G06F 9/542* (2013.01)
USPC ............................ 719/312; 719/314; 719/318

(58) Field of Classification Search
None
See application file for complete search history.

(56) References Cited

U.S. PATENT DOCUMENTS

| | | | | |
|---|---|---|---|---|
| 5,566,337 | A * | 10/1996 | Szymanski et al. | 710/260 |
| 2001/0049726 | A1* | 12/2001 | Comeau et al. | 709/218 |
| 2002/0091863 | A1* | 7/2002 | Schug | 709/250 |
| 2003/0088854 | A1* | 5/2003 | Wygodny et al. | 717/130 |
| 2004/0078799 | A1* | 4/2004 | Koning et al. | 719/313 |
| 2004/0103221 | A1* | 5/2004 | Rosu et al. | 710/1 |

* cited by examiner

*Primary Examiner* — Andy Ho
*Assistant Examiner* — Shih-Wei Kraft
(74) *Attorney, Agent, or Firm* — Muirhead and Saturnelli, LLC

(57) ABSTRACT

Described are techniques for communicating between one or more producers and one or more consumers. A first consumer of an event queue registers for notification regarding occurrences of one or more events. A producer of the event queue posts one or more notifications to one or more consumers of the event queue regarding one or more occurrences of one or more events. Each of the consumers receive notification regarding occurrences of events for which said each consumer is registered. The first consumer retrieves posted event notifications regarding events for which said first consumer is registered. If the first consumer is executing in user space and an event notification list to which said event notifications for said first consumer are posted is located in shared memory, said first consumer retrieves said posted event notifications without proxying into kernel space.

20 Claims, 33 Drawing Sheets

1350

```
add_events(reference, num_events, events[], private_data, private_data_size, qfull_policy, &num_events_queued_rv)

USER SPACE:
1352      - create input params containing kernel reference, private data size, qfull policy, and number of events
1354      - package up the input params, event objects, and private data in the input message list
1356      - create output params that will contain the number of events that were actually queued and package into
               output message list
1358      -send RPC to kernel rpc_call FAST (kernel_id, state_id, eventq_rpc_object, input msg_list,
                             output msg_list, &rpc_status_rv)
1360      -(in kernel) kernel space handler (e.g., eventq_rpc_callback):
             1360a -extracts the kernel reference address, private data size, number of events, and qfull
                      policy from input data
             1360b -extracts the event objects and private data region from the input list
             1360c - calls add_events API
             1360d- sets number of events queued in output params and returns from the RPC to U space
1362      - return status and the number of events queued (from output params) to the caller
```

```
300 ─┐
     │
310 ─┤  create(    name,                /* name of event queue created */
     │             private_data_size,   /* size of private data record */
     │             &handle_rv)          /* handle to event queue created */
     │         );
     │  /*This API is used to create a named event queue that can be used to hold events
     │  whose private data is less than or equal to private_data_size. */
     │
320 ─┤  destroy (handle)  /* handle to previously created event queue */
     │
     │  /* This API is used to destroy a previous created event queue.
     │  A destroy call can either be made explicitly by a user code module running in user or kernel space,
     │  or as a result of cleaning up after a dying container. */
```

FIGURE 3 register_event (reference, /* reference value returned from a previous open API call */
                event)     /* identifies event for which reference is being registered. */
/*
This API is used by a consumer to register for a specific event identified by the event parameter. Upon occurrence of an event matching the event parameter, a notification is added to the event notification list identified by the reference parameter. Consumers may register for any number of different events. When a producer adds an event to an event queue (via add events API call), every consumer that has registered for that event receives a copy of the event as notification by placing the notification on the notification list included in the consumer's reference along with any optional additional private data copied to the consumer's ring buffer. */ unregister_event (reference, /* reference value returned from a previous open API call */
                  event)     /* identifies event for which reference is being registered. */
/*
This API is used by a consumer to unregister for a specific event identified by the event parameter. Once an event has been unregistered, the consumer no longer receives copies of notifications for that event type in the consumer's ring buffer (as associated with the consumer's reference structure)
*/

FIGURE 5

```
add_events (reference,    /* reference returned from previous open API call */
            num_events,   /* number of events */
            events[],     /* one or more events being added */
            private_data, /* ptr to private data area for all events */
            private_data_size, /* size of private data area */
            qfull_policy, /* policy affecting producer/caller if consumer's event notification
                             list (ring buffer) is full */
            &num_events_queued_rv) /* number of events queued by producer */
/*
This API is used by a producer to add events to an event queue. The producer can specify one or more
events and (optionally) a pointer to a contiguous private data area containing the private data associated
with those events. Any consumer currently registered for one of the events matching
an event record included in the events parameter (array) receives a copy of that event in its ring buffer.
If a producer encounters a condition where it is trying to add an event and one of the receiving consumers
has a full notification list (ring buffer is full), the API handles the situation according to the qfull policy
parameter specified by the producer. There are three different qfull policies supported by the add_events
API: PEND, OVERWRITE_OLDEST, and OVERWRITE_NEWEST. The PEND policy causes
the producer to block if the API encounters a qfull situation. The other two policies,
OVERWRITE_OLDEST and OVERWRITE_NEWEST, cause the producer to overwrite,
respectively, the oldest or newest entry in the queue.                                              */
```

FIGURE 6

```
get_events (reference, /* reference returned from previous open API call */
            max_events, /* max number of events to retrieve in this invocation */
            events[],   /* structure for holding event notifications retrieved */
            private_data, /* ptr to data area for any private data */
            private_data_size, /* max amount of private data copied for each event */
            timeout,    /* only wait this long for an event notification if notification list is empty */
            &num_events_rv) /* number of events actually retrieved/consumed from ring buffer */
```

/*
This API is used by a consumer to retrieve events and private data from the consumer's ring buffer. Each consumer (per reference) has a ring buffer for event notification storage as previously allocated during an open API call. Each ring buffer can be allocated from either shared memory or from standard memory. If a ring buffer is allocated from standard memory, a U space consumer cannot access the ring buffer from user space and may use an RPC to proxy into the kernel to collect the events in the kernel. If the ring buffer is allocated from shared memory, a U space consumer can access the ring buffer producer/consumer indices as well as the event objects and private data directly from user space without proxying into the kernel. When using shared memory from a U space consumer, an RPC may be issued to the kernel to signal a waiting producer (as a result of consuming an event from a full ring buffer), or to wait for events (as a result of trying to consume an event from an empty ring buffer).
*/

FIGURE 7

```
Event entry:
event type  /* event type and event id are used in combination to uniquely identify
event id     /* an event. These two may be combined to determine value which is
             /* then hashed when accessing reg table entry */ user context /* can be used to send small amount of user specific data for event.
              Utilize private data area if more is needed */
```

FIGURE 12A create (name, private_data_size, &handle_rv)
/* This API is used to create a named event queue that can be used to hold events whose private data is less than or equal to private_data_size. */

USER SPACE
962 - allocate user space handle
964 - create input params containing private data size
966 - package up input params and name into input msg_list
968 - create output params that will contain the address of the kernel handle for the event queue
970 - package up output params into output msg_list
972 - send RPC to kernel rpc_call FAST (kernel_id, state_id, eventq_rpc_object, input msg_list, output msg_list, &rpc_status_rv)
974 - (in kernel) kernel space handler (e.g., eventq_rpc_callback):
  974a - deconstructs input and output params and passes them to kernel space create API
  974b - kernel space handler sets output_params kernel handle to the handle_rv returned from the K space create API and returns from the RPC to user space
976 - user space create API returns user space handle to caller

KERNEL SPACE
/* may be called from kernel space or from user space via RPC */
981- if the event queue already exists return STATUS_ALREADY_EXISTS
982- otherwise allocate kernel space handle
984- add this handle to the global list of event queues
986- initialize handle metadata (create gate, registration db, etc)
988- initialize the handle refcount to 1
990- return the handle to the caller

FIGURE 16 open (name, num_entries, is_shared, &reference_rv)
USER SPACE:
1052 - allocate user space reference
1054 - create input params containing num_entries and is_shared
1056 - create output params containing the kernel reference address and, if shared, the physical address of the ring buffer and the size of the ring buffer
1058 - package up input params and name into input msg_list
1060 - package up output params into output msg_list
1062 - send RPC to kernel rpc_call FAST (kernel_id, state_id, eventq_rpc_object, input msg_list, output msg_list, &rpc_status_rv)
1064 - (in kernel) kernel space handler (e.g., eventq_rpc_callback):
    1064a - kernel space handler extracts is_shared and name from the input msg_list and passes to kernel space open API
    1064b - kernel space handler stores kernel reference and, if shared, the physical address of the ring buffer and size into the output msg_list
    1064c - kernel space handler returns from the RPC to user space
1066 - if shared then retrieve the physical address of the ring buffer from the output params and map it into the user address space of the container
1068 - store the address of the kernel reference in the user reference
1070 - return the user reference to the caller

FIGURE 18 open (name, num_entries, is_shared, &reference_rv)
KERNEL SPACE:
/* may be called from kernel space or from user space via RPC */

1152 - lookup the handle by name and if not found return STATUS_NOT_FOUND
1154 - allocate kernel reference
1156 - initialize the reference
1158 - calculate the space needed for the ring buffer and the private data region and
allocate them from either shared (if is_shared == 1) or standard memory
1160 - increment the event queue handle refcount
1162 - return the kernel reference to the caller

1100

FIGURE 19 close (reference)

USER SPACE:
1152 - if the ring buffer is shared memory unmap the memory from the container address space
1154 - create input params containing the kernel reference address
1156 - package up the input params into the input msg_list
1158 send RPC to kernel rpc_call FAST (kernel_id, state_id, eventq_rpc_object input msg_list, output msg_list, &rpc_status_rv)
1160 -(in kernel) kernel space handler (e.g., eventq_rpc_callback):
    1160a  -kernel space handler extracts the kernel reference address from the input params and issues the kernel space close API
    1160b  -kernel space handler returns from the RPC to user space
1162 - free the user space reference
1164 - return to the caller

FIGURE 20 close (reference)
KERNEL SPACE
/*may be called from kernel space, from user space via RPC, or during cleanup of a user space container */

1202 - wake up a consumer if one is waiting on this reference. Perform processing to ensure that the consumer doesn't try to wait again 1204 - Perform SEAL GATE processing and wakeup any producers pending in add_events. Sleep for a while and continue waking up producers until all waiting producers have left the gate. (gate is now closed)

1206 - walk all the registration tables in the registration db for the event queue handle and remove any registration entries associated with this reference 1208 - Perform UNSEAL GATE processing to re-open the gate to allow producers back in.

1210 - cleanup the reference metadata

1212 - decrement the handle refcount

1214 - if the reference count is 0 remove the handle from the global list of event queues and free up the handle 1216 - free up the memory associated with the ring buffer 1218 - free the kernel space reference 1220 - return to the caller

FIGURE 21

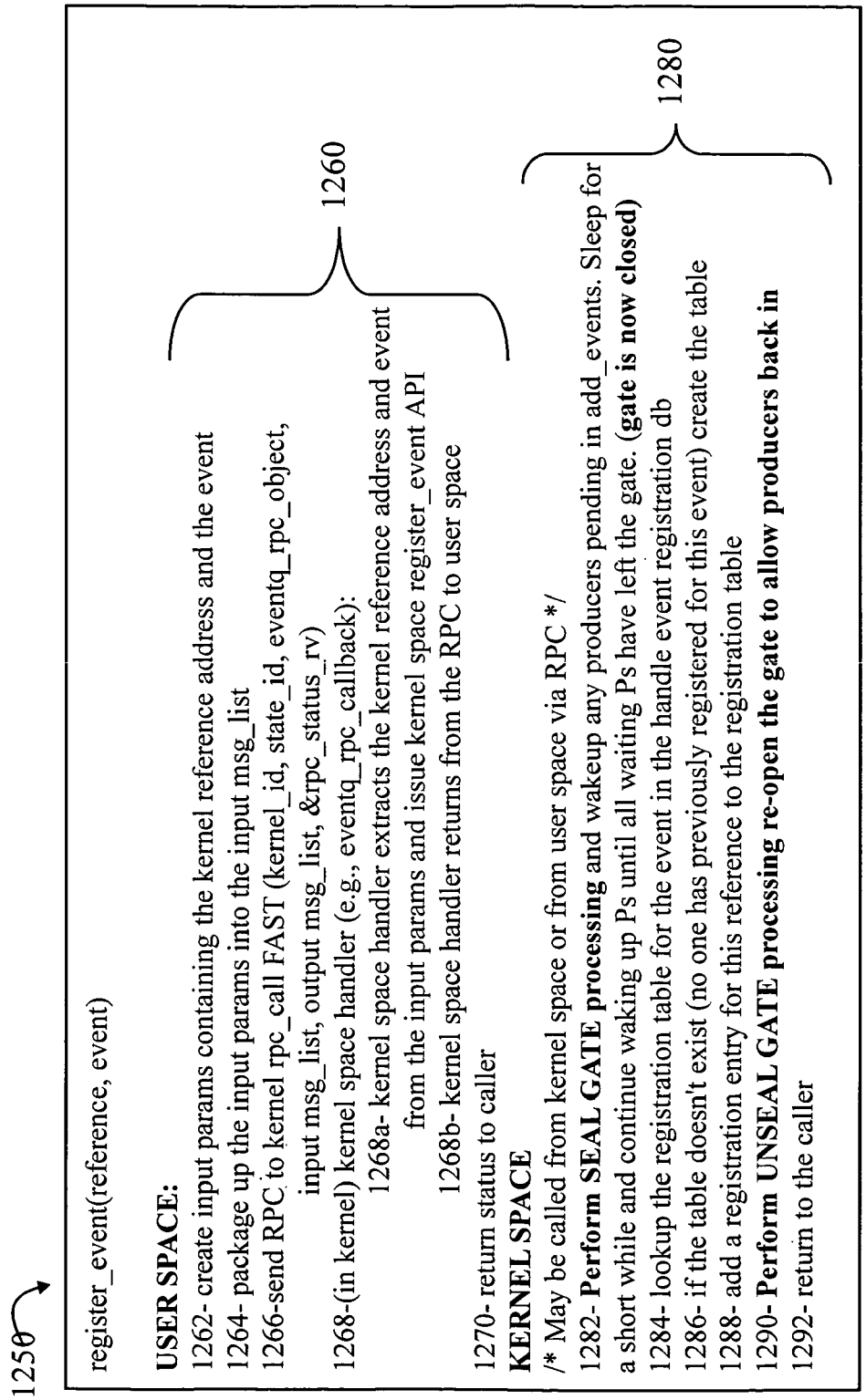

1250 register_event(reference, event)

USER SPACE:
1262- create input params containing the kernel reference address and the event
1264- package up the input params into the input msg_list
1266- send RPC to kernel rpc_call FAST (kernel_id, state_id, eventq_rpc_object, input msg_list, output msg_list, &rpc_status_rv)
1268-(in kernel) kernel space handler (e.g., eventq_rpc_callback):
    1268a- kernel space handler extracts the kernel reference address and event from the input params and issue kernel space register_event API
    1268b- kernel space handler returns from the RPC to user space
1270- return status to caller

}1260

KERNEL SPACE
/* May be called from kernel space or from user space via RPC */
1282- Perform SEAL GATE processing and wakeup any producers pending in add_events. Sleep for a short while and continue waking up Ps until all waiting Ps have left the gate. (gate is now closed)
1284- lookup the registration table for the event in the handle event registration db
1286- if the table doesn't exist (no one has previously registered for this event) create the table
1288- add a registration entry for this reference to the registration table
1290- Perform UNSEAL GATE processing re-open the gate to allow producers back in
1292- return to the caller

}1280

FIGURE 22 add_events(reference, num_events, events[], private_data, private_data_size, qfull_policy, &num_events_queued_rv)

USER SPACE:
1352 - create input params containing kernel reference, private data size, qfull policy, and number of events
1354 - package up the input params, event objects, and private data in the input message list
1356 - create output params that will contain the number of events that were actually queued and package into output message list
1358 - send RPC to kernel rpc_call FAST (kernel_id, state_id, eventq_rpc_object, input msg_list, output msg_list, &rpc_status_rv)
1360 -(in kernel) kernel space handler (e.g., eventq_rpc_callback):
    1360a -extracts the kernel reference address, private data size, number of events, and qfull policy from input data
    1360b -extracts the event objects and private data region from the input list
    1360c - calls add_events API
    1360d- sets number of events queued in output params and returns from the RPC to U space
1362 - return status and the number of events queued (from output params) to the caller

FIGURE 24

1400 add_events(reference, num_events, events[], private_data, private_data_size, qfull_policy, &num_events_queued_rv)
KERNEL SPACE /* may be called from kernel space or from user space via RPC */
- for each event being added do the following steps:
1401) - Perform ENTER GATE to enter gate if open. If the gate is closed sleep periodically until it is open again
1402) - look up the registration table for the event in the handle's event registration db
1403) - for each entry in the registration table do the following steps:/ *for each registered C */
1404) - take the producer mutex (P mutex) for this C to serialize access to this C's reference with other Ps
1405) - make two copies of the producer and consumer indexes (position info)
   (one to save original value and another to modify to reflect new values)
1406) - use the indices to calculate the number of free slots in the ring buffer for the current C
1407) - if there are no free slots and the qfull policy is overwrite oldest/newest discard
   oldest or newest slot accordingly
1408) - if there are no free slots and the qfull policy is pend perform the following steps:
1409)   - Perform CHECK GATE to make sure it hasn't closed while processing event
1410)   - if the gate was closed release the P mutex and start again at step 1401
1411)   - wait on the P wait semaphore for the C to free up a slot
1412)   - if the wait was interrupted drop the P mutex and proceed to step 1420 and return
       from API with STATUS_INTERRUPTED /* IF U process dies */
1413)   - return to step 1405
1414) - if there are free slots then:
1414a)   -copy the event to the first free slot in the ring buffer and the private
       data to the first free slot in the private data region
1415)   - update producer index in local copy of position info
1416)   - use CAS to try to update position info for current consumer
1417)   - if CAS failed restart operation for current consumer
1418)   - if we just added an event to a queue that was previously empty then signal
       C semaphore (check unchanged copy of position info to determine free slots)
1419) - unlock the producer mutex (P mutex) for this consumer
1420) - Perform EXIT GATE processing.
1421)- return the number of events processed to the caller 1424 (braces around 1409-1413)
1426 (braces around 1414a-1418)

FIGURE 25

1450 get_events(reference, max_events, events[], private_data, private_data_size, timeout, &num_events_rv)
USER SPACE
1460 - if the event notification Q is NOT allocated from standard memory perform following steps: /*UNOPTIMIZED*/  ⎫
1462  - create input data containing the kernel reference, private_data_size, and max_events                      ⎪
1464  - package up the input data into the input msg_list                                                          ⎪
1466  - package up the event objects (events[]) and the private data into the output msg_list                      ⎬ 1463a
1468  - send RPC to kernel rpc_call FAST (kernel_id, state_id, eventq_rpc_object, input msg list,                  ⎪
         output msg list, &rpc_status_rv)                                                                          ⎭
1470  -(in kernel) kernel space handler (e.g., eventq_rpc_callback):
1470a    - kernel space handler extracts parameters from input msg_list and private data and
           events[] from output message list and calls get_events API
1470b    - kernel space handler sets output msg_list entry for events[] to actual size of events[]
           based on the number of events that were received
1470c    - kernel space handler sets output msg_list entry for private_data to actual size of private
           data based on the number of events that were received
1470d    - return from RPC to user space
1480 - if the event notification Q is allocated from shared memory perform the following steps: /*OPTIMIZED*/      ⎫
1482  - make two copies of the producer and consumer indexes (position info)                                       ⎪
         /**(one to save original value and another to modify to reflect new values) */                            ⎪
1486  - calculate the number of used slots in the ring buffer                                                      ⎪
1488  - if there are no events then use the kernel RPC to proxy to the kernel and wait on the C semaphore          ⎪
1490  - for each event found (up to max events) copy the event information and private data from the               ⎪
         ring buffer into events[] and private_data                                                                 ⎬ 1463b
1492  - update the local copy of the Cindex to reflect the number of events consumed                               ⎪
1494  - use CAS to update the position_info ring buffer indices using local copy and original position info        ⎪
1496  - if the indices changed while we were consuming the events then restart (step 1480)                         ⎪
1498  - if the queue was full before we consumed the entries then use the RPC to proxy to the kernel and           ⎪
         wake up the P semaphore                                                                                   ⎭
1499  - set the number of events (num_events_rv) that were consumed and return to the caller

FIGURE 26

1500 get_events(reference, max_events, events[], private_data, private_data_size, timeout, &num_events_rv)
KERNEL SPACE

1502- make two copies of the producer and consumer indexes (position info)
/** (one to save original value and another to modify to reflect new values)

1504- calculate the number of used slots in the ring buffer 1506- if there are no events then wait on the consumer semaphore 1508- for each event found (up to max events) copy the event information and private data from the ring buffer into events[] and private_data 1510- update the local copy of the consumer index to reflect the number of events consumed 1512- use CAS to update the position_info ring buffer indexes based on the local copy and the original position info 1514- if the indexes changed while we were consuming the events then restart /goto step 1502

1516- if the queue was full before we consumed the entries then signal the producer semaphore to wake up the waiting producer 1518- set the number of events (num_events_rv) that were consumed and return to the caller

FIGURE 27

EVENT QUEUES

RELATED APPLICATIONS

This application is a continuation of U.S. application Ser. No. 12/286,493 filed Sep. 29, 2008, now U.S. Pat. No. 8,271,996, which is hereby incorporated by reference.

BACKGROUND

1. Technical Field

This application generally relates to code execution, and more particularly to techniques used for communicating between different code modules.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Code modules that execute on a data storage system, as well as other systems, may use a variety of different techniques for inter-module communications. An environment in which the code executes may provide a facility for such inter-module communication. It may be desirable to utilize a flexible and efficient communication model and facility allowing communications to be exchanged between executing code modules.

SUMMARY OF THE INVENTION

In accordance with one aspect of the invention is a method for communicating between one or more producers and one or more consumers comprising: registering, by a first consumer of an event queue, for notification regarding occurrences of one or more events; posting, by a producer of the event queue, notification to one or more consumers of the event queue regarding one or more occurrences of one or more events, each of said one or more consumers receiving notification regarding occurrences of events for which said each consumer is registered, said one or more consumers including said first consumer; and retrieving, by said first consumer, posted event notifications regarding events for which said first consumer is registered, wherein, if said first consumer is executing in user space and an event notification list to which said event notifications for said first consumer are posted is located in shared memory, said first consumer retrieves said posted event notifications without proxying into kernel space, and wherein if said event notification list of said first consumer is not located in shared memory, said first consumer proxies into kernel space to retrieve said posted event notifications from said event notification list. The event notification list may be implemented using a ring buffer. The event queue may be used by different containers for communicating therebetween, each of said different containers executing in a context of its own address space that is different from address spaces of other containers. Posting a notification regarding an occurrence of an event may include posting an event notification to an entry in said ring buffer and posting additional data to a private data area, said private data area being located in shared memory if said event notification list is included in shared memory. The producer may use a first application programming interface to create a first reference structure to said event queue, and said first consumer may use the first application programming interface to create a second reference structure to said event queue. The first consumer may use a second application programming interface to perform said registering. Each invocation of said second application programming interface by said first consumer may identify said second reference structure. The first consumer may use a third programming interface to perform said retrieving, each invocation of said third programming interface by said first consumer identifying said second reference structure. The producer may use a second application programming interface to perform said posting. Each invocation of said second application programming interface by said producer may identify the first reference structure. The producer may also be a consumer of one or more events for which said producer has registered using said second application programming interface. Each invocation of said second application programming interface by said producer may identify the first reference structure. An application programming interface may be invoked by code of a container other than said producer and said one or more consumers to create said event queue. The steps of registering, posting and retrieving may be performed using defined interfaces. The defined interfaces may be used when said producer executes in user space and said first consumer executes in user space, when said producer executes in user space and said first consumer executes in kernel space, and when said producer executes in kernel space and said first consumer executes in user space. The event queue may be associated with a registration database of registered events for which consumers are registered. Processing performed to modify said registration database may include performing processing to close a logical gate, awakening all waiting producers of said event queue waiting for a free entry in any notification list of any consumer of said event queue, modifying said registration database, and opening said logical gate. Processing performed by said producer in connection with said posting of an event notification for a first event to said event notification list of said first consumer may include: reading information from said registration database when said producer determines that said logical gate is opened, said information indicating that said first consumer is registered to receive notifications regarding said first event; acquiring a mutex to synchronize access to said first consumer's event notification list with other producers; and if there are no free entries in said first consumer's event notification list and said producer is trying to post an event notification to a free entry in said first consumer's event notification list, said producer determines whether the gate is closed, and if the gate is closed, the producer releases said mutex and resumes processing when said gate is opened, and if the gate is open, said producer blocks waiting for a free entry in said first consumer's event notification list. An application programming interface may include a first defined interface for use by a consumer to perform said registering, a second defined interface for use by a consumer to unregister for a specified event, and a third defined interface used by producers and consumers of said event queue to indicate that an invoking container is ending use of said event queue for communications with other containers which have opened said event queue for communications using a fourth defined interface. Code of routines for said first defined interface, said second defined interface and said third defined interface may modify said registration database. The application programming interface may include a fifth defined interface used by a producer to perform said posting. The fifth defined interface may include a parameter indicating a policy utilized in connection with posting an event notification to a consumer's event notification list when the consumer's event notification list is full. The parameter may indicate one of a plurality of policies, said plurality of policies including pending, overwrite oldest, and overwrite newest, wherein said pending causes processing of a posting producer to wait until an entry in the consumer's event notification list is free, said overwrite oldest causes a posting producer to overwrite an oldest entry in the consumer's event notification list when full, and said overwrite newest causes a posting producer to overwrite a newest entry in the consumer's event notification list when full. A defined interface may be used by said first consumer to perform said retrieving. The defined interface may include a parameter indicating a timeout value, wherein, if said event notification list of said first consumer is empty, said timeout value specifies an amount of time said first consumer waits for an event notification to be posted to said event notification list prior to said first consumer continuing processing.

In accordance with another aspect of the invention is a computer readable medium comprising executable code thereon for facilitating communications between one or more producers and one or more consumers, the computer readable medium comprising executable code for: a first interface for opening communications between an invoking container and other containers using said event queue, said first defined interface being invoked by producers and consumers of said event queue prior to using said event queue for communicating with other containers, said first interface returning a reference to said event queue; a second interface used by a consumer of said event queue to register for notification regarding occurrences of one or more events, said second interface including a parameter indicating said reference used by said consumer; a third interface used by a producer of said event queue to post one or more notifications regarding one or more occurrences of one or more events to one or more consumers, each consumer receiving a notification on an event notification list used by said consumer regarding events for which said each consumer has registered using said second interface; and a fourth interface used by a consumer to retrieve event notifications from an event notification list regarding events for which the consumer is registered, wherein if the consumer is executing in user space and the event notification list of the consumer is located in shared memory, said consumer retrieves the event notifications therefrom without proxying into kernel space, and wherein if said event notification list of the consumer is not located in shared memory, said consumer proxies into kernel space to retrieve the event notifications therefrom. The third interface may include a parameter indicating a policy utilized in connection with posting an event notification to a consumer's event notification list when the consumer's event notification list is full, said parameter of said third interface indicating one of a plurality of policies. The plurality of policies may include pending, overwrite oldest, and overwrite newest, wherein said pending causes processing of a posting producer to wait until an entry in the consumer's event notification list is free, said overwrite oldest causes a posting producer to overwrite an oldest entry in the consumer's event notification list when full, and said overwrite newest causes a posting producer to overwrite a newest entry in the consumer's event notification list when full. The fourth interface may include a parameter indicating a timeout value, wherein, if said event notification list of said consumer is empty, the timeout value may specify an amount of time said consumer waits for an event notification to be posted to said event notification list prior to said consumer continuing processing. The first interface may include a parameter indicating whether an event notification list of said invoking container is located in shared memory, and wherein a producer invoking said first interface may indicate that said event notification list is created to hold no entries. The event queue may be used for communicating between different containers. Each of the different containers may execute in a context of an address space that is different from address spaces of other containers. The computer readable medium may include code for implementing said interfaces between a producer executing in user space and a consumer executing in user space, between a producer executing in user space and a consumer executing in kernel space, and between a producer executing in kernel space and a consumer executing in user space.

BRIEF DESCRIPTION OF THE DRAWINGS

Features and advantages of the present invention will become more apparent from the following detailed description of exemplary embodiments thereof taken in conjunction with the accompanying drawings in which:

FIGS. 3, 4, 5, 6, and 7 are examples illustrating defined interfaces that may be included in an event queue API in connection with an embodiment in accordance with techniques herein;

FIGS. 9, 10, 11, 12, 12A, and 13 are examples of data structures that may be used in connection with an embodiment in accordance with techniques herein;

FIGS. 15, 16, 17, 18, 19, 20, 21, 22, 23, 24, 25, 26, and 27 are examples illustrating logical processing that may be performed in connection with the event queue API in an embodiment in accordance with techniques herein;

DETAILED DESCRIPTION OF EMBODIMENT(S)

Figure 1:
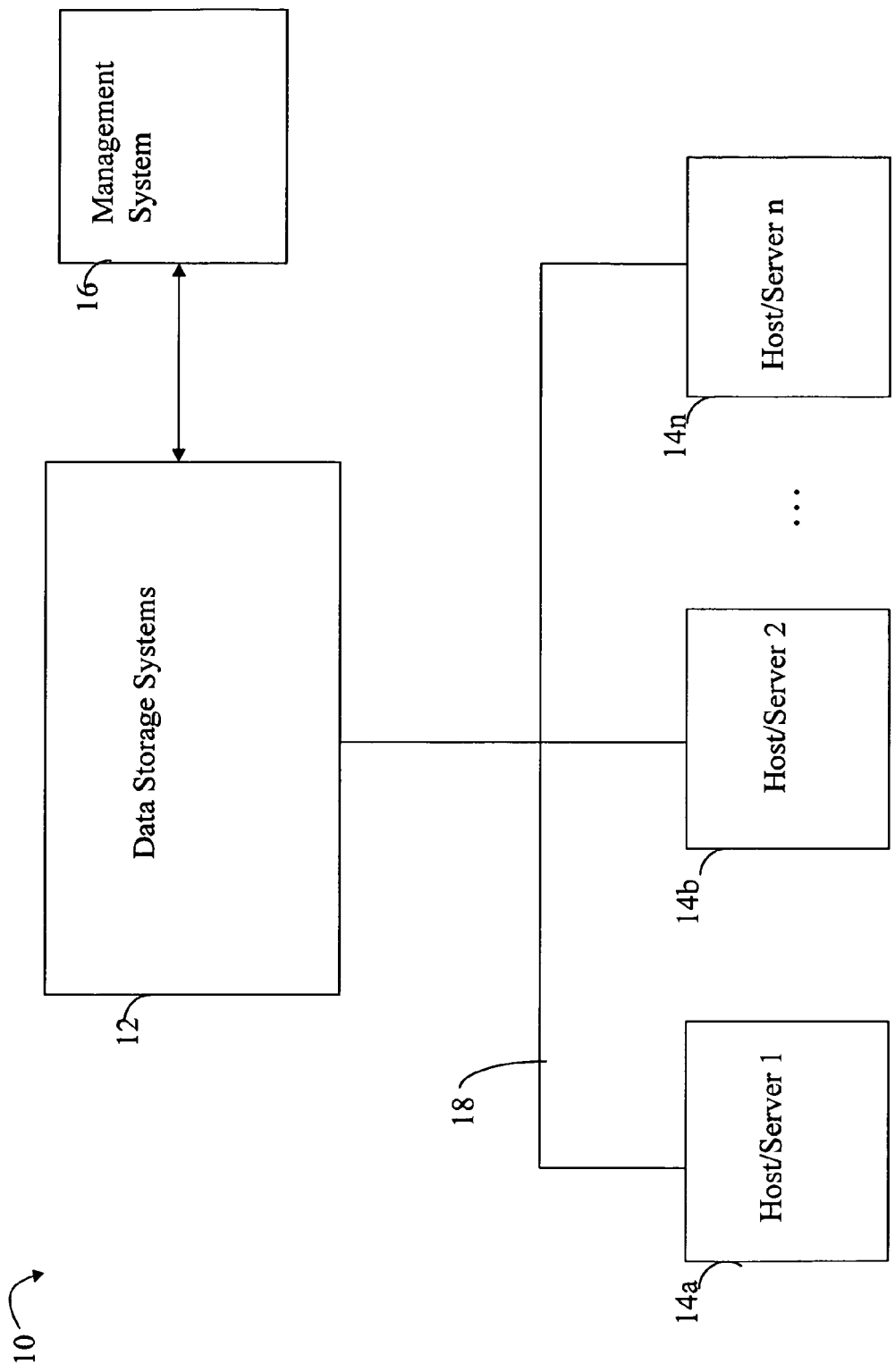
FIG. 1 is an example of an embodiment of a system that may utilize the techniques described herein.

With the growing popularity of all types of data storage devices, there is also a growing demand for software and features for data storage devices. However, developing software components for the devices is a difficult task because storage devices operate under constraints which at least in some cases are distinct or prioritized differently from those imposed on other types of computing systems.

For example, data storage devices require solutions to different sets of problems. A wide variety of data storage hardware solutions are available in the market. The solutions require significant efforts from software developers to provide high performance and reliability and other desired storage features and to integrate them with software solutions that would present to the end-customers easy and friendly user-interfaces. In addition, providers of hardware solutions are challenged to provide reasonable hardware-to-software interface mechanisms.

In many cases these constraints have resulted in providing largely static and non-expandable programming environments for data storage devices. The programming environments for these devices also tend to lack a common or standard interface to handle the integration of software components in a data storage environment. Thus, the creation of component-oriented software is rendered difficult and becomes a custom solution. Accordingly, conventional programming and testing environments for such devices present a substantial obstacle to software developers for such devices. Adding functionality to the operating system of a storage device can be difficult. Adding the same functionality to a storage device having a different operating system may require in general not only a different set of function calls and programming methods, but a different programming environment altogether.

Examples of conventional methods providing platform independence include the CORBA architecture and Sun Microsystems' Java. A CORBA architecture employs a middle layer called Object Request Broker ("ORB") to facilitate integration of software objects. The middle layer requires memory and a CPU's processing power.

A conventional Java architecture employs a virtual machine which provides platform independence at run-time. A virtual machine facilitates different object components to find each other, and the object components interact with each other via the virtual machine. Because object components interact and execute via the virtual machine versus execution of native code of the underlying processor, the processing speed is noticeably slowed down in a Java architecture. In addition, the virtual machine requires a large amount of memory and only executes code in user space. Furthermore, a software developer is required to use the Java language, and thus needs to expend a large amount of time and effort to become versatile in using a Java system. In addition, a large amount of legacy code written in non-Java language becomes unavailable in a Java architecture.

It is desirable to have flexible and platform independent programming environments for storage devices, especially given the growing demand for storage devices having a variety of different data storage system environments.

As described at least in part below, a storage software platform architecture can be provided that converges and leverages existing platform capabilities and technologies with other assets to provide a sustainable advantage.

In at least some implementations the architecture allows developers to focus on the customer experience and quality, improved product scalability, reliability, and availability, innovation in response to customer need, development of best of breed products and solutions, product line breadth, and enterprise and data center technologies. In at least some implementations the architecture also facilitates development and/or improvement in key areas such as convergence and leverage, ease of use, channel readiness, consistency and flexibility, application awareness, storage solutions and services, success at the lower end of the market, and efficiency, productivity, and focus of development resources.

In at least one aspect, the architecture is or includes a scalable, common architecture that can be extended across many technical and industry dimensions, and that takes into account that performance considerations vary, that availability and quality concerns may be high but have different complexities, that security is constant (but with perimeter versus internal security priorities varying), and that many different topologies exist. In at least one implementation, the architecture is or includes a unified architecture for integrated management of network attached storage (NAS), and object and storage block services.

The architecture may include features such as openness, application awareness, ease of use and management, partner enablement, scaling, globalization, enhanced platform architecture, and enhanced availability and reliability. Openness may rely on and/or leverage proprietary and third party technologies for accessibility and user interface. Application awareness may include automated discovery, application provisioning, and self-management. Ease of use and management may include a unified user experience, total lifecycle coverage, self-management, and active communities. Partner enablement may include features that facilitate sales channels and OEM arrangements. Scaling may include a range from small and medium size businesses to enterprise, and may include scaling up and scaling out. Globalization may include fully internationalized systems, with localized user interface screens and behavior. Enhanced platform architecture may include modular building blocks and well defined interfaces. Enhanced availability and reliability may include fault domains and autonomous management.

At least one implementation of the architecture takes into account that, from a high level perspective, many different storage platforms have many of the same features, such as moving data from one I/O chip to memory to another I/O chip, high availability, clustering, peer to peer replication, and drive management, and such platforms also support similar interface protocols, transformations, and methods. However, if such platforms have significantly varying implementations and external interfaces, and little commonality, development involves significant duplication of functionality and work, and it can be difficult to move technology or techniques from platform to platform, share or reuse technology or techniques, combine technology or techniques from different platforms together or with new applications, or otherwise avoid doing the same work multiple times. For example, if a new feature or new standard is needed, the new feature or standard must be implemented separately for each platform.

A convergence-oriented common software environment (CSE) based on the architecture takes into account different base architectural assumptions, different terminology for similar concepts, different behaviors or expressions for similar features, different high availability, different clustering, scaling, and non destructive upgrade models, different wire protocols (e.g., replication, mainframe), and different management interfaces and look-and-feel interfaces. As a result, the environment takes into account different software environments, different base operating systems dictating hardware, and different hardware dictating base operating systems.

Thus, the common software environment enables mechanical commonality as a prelude to enabling architectural commonality, with the results that the value of developed technology increases, commonality increases, it takes less work to maintain the same base of functions or add features, flexibility increases, the ability to effect rapid change is improved, technology and techniques are freed from existing mechanical then architectural constraints, the ability to combine existing technology and techniques with new technology and techniques in new ways increases, lost opportunity costs are regained, resources are freed up to refactor and rationalize rather than rewrite or discard current technology or techniques, the underlying basics of technology is preserved, enabling virtualization, code is strengthened by preserving field experience, development, testing, and support are made more efficient, and reliability is improved.

Referring to FIG. 1, shown is an example of an embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 20. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hard-wired connection(s) by which the host systems 14a-14n may access and communicate with the data storage systems 12, and may also communicate with other components (not shown) that may be included in the system 10. In one embodiment, the communication medium 20 may be a LAN connection and the communication medium 18 may be an iSCSI or fibre channel connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or a fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16.

In one embodiment, the one or more data storage systems 12 of FIG. 1 may be an appliance with hardware and software for hosting the data storage of the one or more applications executing on the hosts 14a-14n. The appliance may include one or more storage processors and one or more devices upon which data is stored. The appliance may include software used in connection with storing the data of the hosts on the appliance and also software used in connection with techniques described in following paragraphs which are part of a common software environment (CSE).

In another embodiment, the data storage systems 12 may include one or more data storage systems such as one or more of the data storage systems, such as a data storage array, offered by EMC Corporation of Hopkinton, Mass. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein for the common software environment.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

In following paragraphs, reference may be made to a particular embodiment such as, for example, an embodiment in which element 12 of FIG. 1 is an appliance as described above. However, it will be appreciated by those skilled in the art that this is for purposes of illustration and should not be construed as a limitation of the techniques herein.

The common software environment may include components described herein executing on each data storage system. Each of the data storage systems may have any one of a variety of different hardware and software platforms comprising a supported environment. For example, a first data storage system may include the common software environment with a first operating system and underlying hardware. A second data storage system may include the common software environment with a different operating system and different underlying hardware.

The common software environment includes a framework which may be implemented using APIs (application programming interfaces) and other code modules described herein. The APIs may implement the underlying functionality which varies with the different possible data storage system hardware and software platforms. As such, code may be written using the APIs so that the code is insulated from the underlying platform dependencies. The code may be executed on any data storage system utilizing the APIs regardless of the particular hardware and/or software platform of the data storage system. Additionally, the API may be written so that the code is allowed to execute in user space or kernel space as will be described in more detail herein. As such, the API may utilize the underlying primitives of the particular operating system or may also emulate functionality on an operating system lacking a particular feature. A code module using the API can also execute in user mode or kernel mode on a supported operating system. For example, a code module may make a first API call on a data storage system having a first operating system. For the first operating system, the API may implement the first API call utilizing the underlying primitives of the first operating system. The code module may also be executed on another data storage system having a second different operating system. For the second operating system, the first API call may be implemented using the primitives of the second operating system. The second operating system may not have a rich or full set of primitives so the API may emulate the necessary functionality of the primitives missing from the second operating system. The API uses the underlying operating system primitives where available and may otherwise synthesize or emulate the functionality necessary as may vary with the capabilities of each operating system. The code module may also execute in user or kernel mode on the first and second operating systems.

Figure 2:
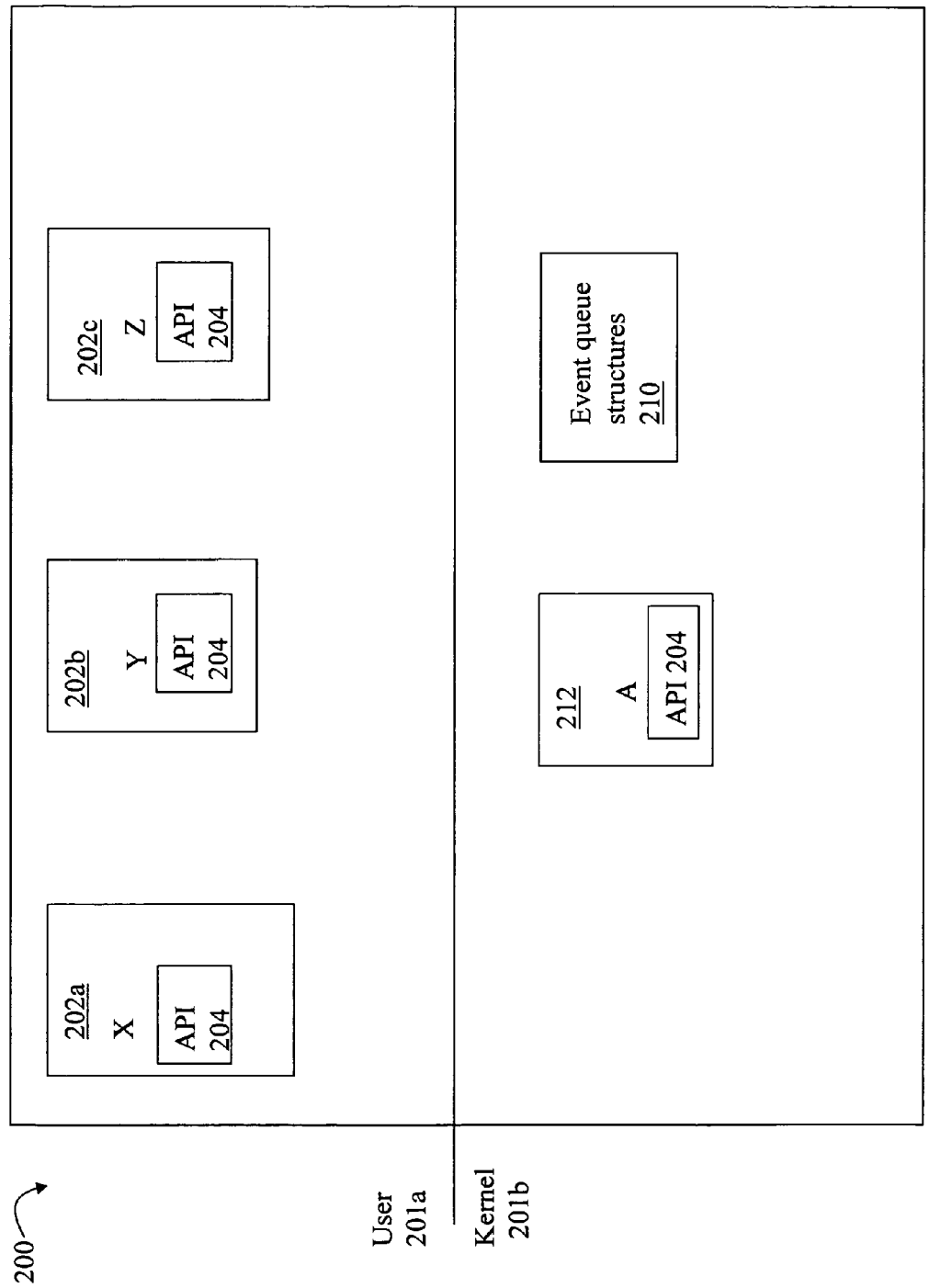
FIG. 2 is an example illustrating use of an API (application programming interface) in connection with a same code module that may be executed in user space and kernel space.

Referring to FIG. 2, shown is an example of components that may be executing on a processor node of a data storage system. If a data storage system has multiple processors, FIG. 2 illustrates components that may be executed by each such processor and includes user mode processes 202a, 202b and 202c and module 212 executing in kernel mode.

In the example 200, shown are user mode or user space 201a and kernel mode or kernel space 201b with different entities executing in each mode. As known in the art, code executing in the kernel mode may be characterized as a privileged execution mode with unrestricted access to system memory and hardware devices. Operating system code typically executes in kernel mode. In contrast, code executing in user mode may be characterized as a non-privileged mode of execution with restricted access to the system memory and hardware devices. In the example 200, elements 202a, 202b, and 202c may be user space processes or containers each having their own process address space. Thus, each user space process may be characterized as a single container or fault domain for fault containment purposes. In other words, each user process has its own state and can have an execution fault independent of, or isolated from, the other user processes. Thus, when one of the user processes experiences a fault, the other user processes may continue to execute without being affected by the fault. When a first of the executing processes is notified of the failing process, the first process may also notify other executing user and/or kernel space modules. The first process, or other currently executing user space process, may perform processing on behalf of the failing process and may perform cleanup associated with the failing process. In one embodiment, each user process can save information about its own state in an area of memory external to the process so that another instance of the same user process can perform cleanup, resume processing of the failed process, and the like. Additionally, a currently executing user space process may take steps in response to the failing process in accordance with any outstanding requests or processing being performed by the failing process on behalf of the currently executing process. For example, a first process may reissue its request previously made to a failing user process to another user process instance performing the same services or functionality as the failing process. In contrast, all code executing in the kernel mode may execute in the context of the same address space so that if a fault occurs during execution of a kernel mode process or thread, the operating system may experience a failure. Thus, all the code executing in kernel mode 201b may be characterized as a single kernel fault domain or container in contrast to each instance of 202a, 202b, and 202c executing in user mode 201a. Typically, code such as device drivers execute in kernel mode. As will be described in following paragraphs using the common software environment herein, a code module using APIs which implement user and kernel mode variations of necessary operations can execute in both user and kernel mode without modification to the original source code. In other words, for a given API call, any coding difference in implementing the API call when executing in user or kernel mode, different operating system, or other data storage system environment particular, may be embedded in the code of the API.

Described in following paragraphs is an API that may be used in connection with an inter-container (e.g inter address space) event queue facility where the producers and consumers of the events may execute in user space or kernel space. That is, each producer may execute in user mode or kernel mode and each consumer may execute in user mode or kernel mode. In one embodiment described herein, the structures 210 for implementing the event queue may be kernel resident and calls between user space and kernel space (including calls made by code of the event queue facility and API described herein) may be facilitated using another facility, remote procedure call (RPC) facility, where a first code module in a first container makes a remote procedure call to a second container. An RPC API may be utilized as described in U.S. patent application Ser. No. _____, filed on even date herewith, REMOTE PROCEDURE CALLS, Attorney Docket No. EMS-242US ("RPC patent application"), which is incorporated by reference herein. The RPC mechanism and facility described in the RPC patent application includes an API with a client interface and a server interface for performing inter-container calls. In accordance with the techniques herein, the RPC mechanism and facility described in the RPC patent application may be utilized in an embodiment in connection with U-K communications, for example, where a container, such as a consumer container or producer container of events, executes in user mode in order to access the event queue structures as needed for different event queue processing operations. This is described in more detail in following paragraphs.

In the example 200, each of the user mode processes 202a, 202b and 202c may use the same API 204. Code executing in the kernel space, such as software component or module 212, may also utilize the same API 204. The underlying details of implementing the functionality of the API call are embedded in the API code and not the code associated with 202a-202c and 212. Using the API, an embodiment may make a same set of functionality available to code that executes in both user and kernel space and leave the implementation details of the API calls to be included in the API code. The same event queue API may be used when the consumer executes in user mode or kernel mode, and when the producer executes in user mode or kernel mode. Similarly, an embodiment may implement the event queue API described herein using the RPC API described in the RPC patent application where the RPC API may be used for U-U RPCs, U-K RPCs, and K-U RPCs.

Figure 2A:
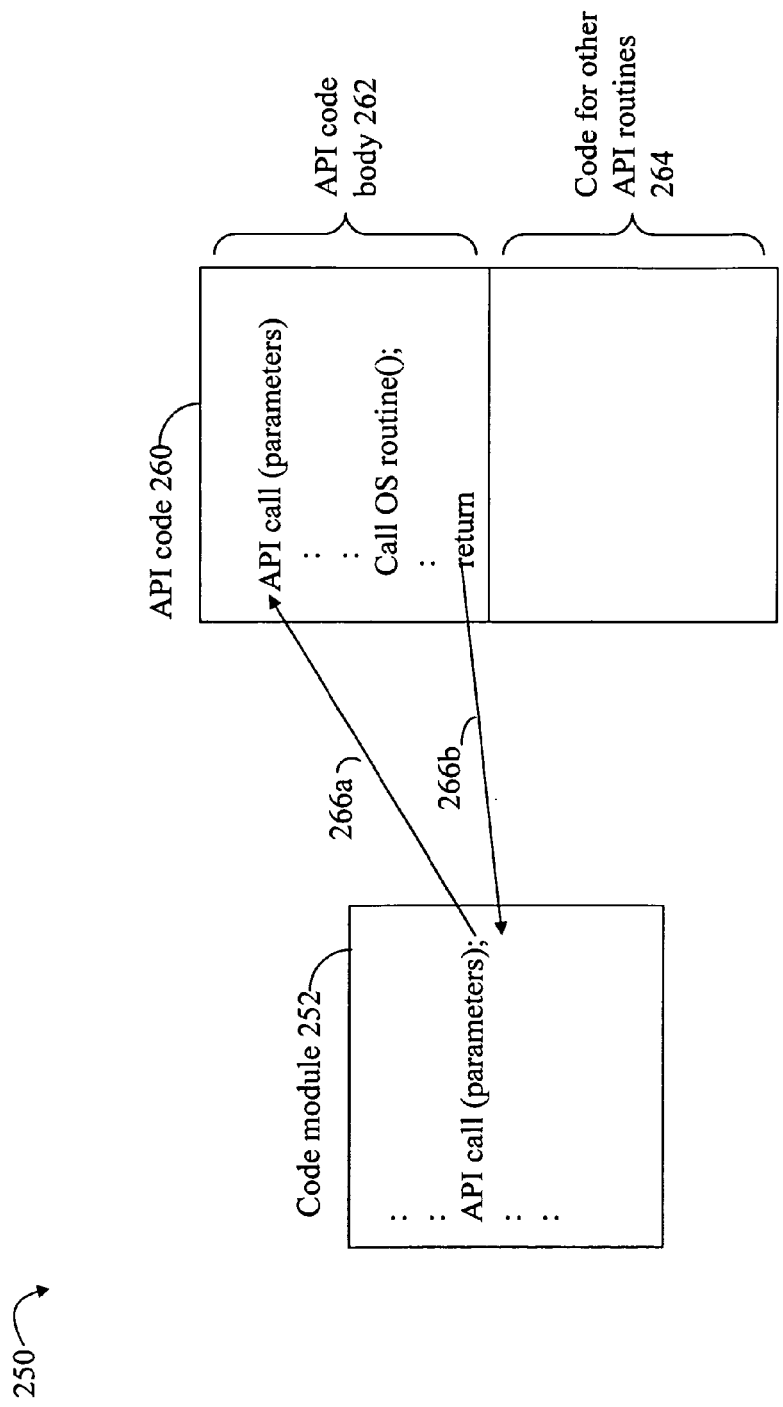
FIG. 2A is an example illustrating how code of the API may be used as a wrapper around platform-dependent calls to insulate a code module and promote portability in an embodiment using the techniques herein.

Referring to FIG. 2A, shown is an example illustrating general data flow between a code module and code of the API in accordance with techniques herein. The example 250 also illustrates the API code utilizing underlying native operating system functionality. The API code effectively provides a "wrapper" or layer of code around the underlying operating system calls that may be made to implement functionality of the particular API feature and operation. The API thus insulates the code module 252 from the different operating system specific calls that may be made to implement the API functionality providing portability of the code module across different operating systems that may be used in different execution environments. Similarly, the code module 252 is insulated from the coding differences that may occur in order to implement the API functionality in user and kernel mode. It should be noted that, as described herein, the underlying operating system functionality may vary with environment. Where a particular functionality needed to perform an operation in connection with the API is not directly available in a native operating system, the functionality may be emulated or synthesized using other functionality which is available in the native operating system.

The example 250 includes code module 252 which makes a call, "API call (parameters)", to code in the API. When the code module 252 is executed and the foregoing API call is made, control is transferred to an entry point in the API code 260 as indicated by 266a. The API code body 262 is executed and may invoke one or more operating system routines (OS routines) to implement the particular operation of the API call. Subsequently, control is returned to the code module 252 as indicated by 266b when the API code body 262 has completed. It should be noted that in the example 250, the code module 252 calls a routine in the API. The code module 252 may be code developed to run in user mode, kernel mode, and/or in any one of a variety of different environments each having a different operating system. The API routine may return to the calling routine once the called API routine has completed.

The example 250 illustrates a template in which functionality provided in the native environment, such as by an operating system, may be used by the API so that user or developer code invokes the API rather than calling the underlying operating system routines directly. Such code which invokes the API rather than directly invoking the underlying operating system routines provides portability of the developed code module across user and kernel mode as well as the different supported environments.

In one embodiment of the event queue API, the RPC facility may be build on top of, and utilize, a lower level inter-module communication mechanism (for inter-container communication) and technique to facilitate inter-module communication between two code modules executing in user mode (U-U communication between containers), or between a first code module that executes in user mode and a second code module that executes in kernel mode (U-K and K-U communication).

The inter-module communication techniques described in U.S. patent application Ser. No. 12/079,759 (the '759 application), filed Mar. 28, 2008, TECHNIQUES FOR INTER-USER-SPACE COMMUNICATION, and U.S. patent application Ser. No. 12/079,822 (the '822 application), filed Mar. 28, 2008, TECHNIQUES FOR USER SPACE AND KERNEL SPACE COMMUNICATION, both of which are incorporated by reference herein, may be used in connection with inter-module communication between containers as needed to implement the RPCs for inter-container communications. As described in the '759 and '822 applications, the API may also include interfaces defined and used to facilitate inter-module communication between two code modules in different containers executing in user mode (U-U communication), or between a first code module that executes in user mode and a second code module that executes in kernel mode (U-K and K-U communication). A first code module initiates a transaction or a command request and invokes a second code module. The first code module may also be referred to as a client and the second code module may be referred to as the server. In accordance with the techniques described in the foregoing two patent applications, U-U communications may be utilized when both client and server are user mode processes, U-K communications may be utilized when the client executes in user mode and the server executes in kernel mode, and K-U communications may be utilized when the client executes in kernel mode and the server executes in user mode. In connection with the techniques herein, the client may issue requests to a server to perform a remote procedure call and the appropriate inter-module communications may be used depending on the particular mode (e.g., user U or kernel K) of each of the client and server.

In accordance with the techniques described herein, a code module may be executed using a communications model (such as the inter-module and inter-container communications described above in the '759 and '822 applications), RPC mechanism and facility (as described in the RPC patent application), and event queue facility (as described herein) where interfaces and associated code for all of the foregoing may be embodied in the API in both user space and kernel space meaning that the same set of operations are available in user space and kernel space. In one embodiment, the API may include the event queue API described herein, the RPC facility and API of the RPC patent application, and the inter-module communications model and API for inter-container communications as described in the '822 and '759 applications. Code may be written using this API including a defined interface that provides code portability across user and kernel mode in all supported environments.

As will be described in following paragraphs in accordance with techniques herein, an event queue facility and interface is defined that may be used by producer containers and consumer containers of events using kernel resident structures. The producer containers may be in user mode or kernel mode, and the consumer containers may be in user mode or kernel mode.

In an embodiment in accordance with techniques described herein, an event queue may be used to facilitate the exchange of information between containers. Furthermore, the techniques herein may also be used in connection with facilitating communications between a producer and a consumer included in the same container as well as different containers. Additionally, the techniques herein may be used to facilitate communications between a producer and consumer in a same container, alone or in combination with, other producers and consumers included in different containers. Similarly, the techniques herein may be used to facilitate communications between a producer and consumer in different containers, alone or in combination with, other producers and consumers included in the same and/or different containers. A consumer may register to receive notification regarding each occurrence of one or more events. A producer may post a notification to the event queue regarding the occurrence of an event and each registered consumer may receive notification of the event occurrence. A consumer may register for specific events with a particular event queue and a consumer may post notification regarding event occurrences with the particular event queue. A container may be both a producer and a consumer with respect to one or more of the same event queues and one or more of the same events. For example, a thread in a container may be a producer of events and the same thread and/or a different thread in the container may be a consumer of the same and/or different events and thus, the foregoing container may be characterized as both a producer and consumer. As an example with reference back to FIG. 2, containers X, Y and A may register to receive notification of one or more particular events regarding container Z, such as, for example, when container Z is created, terminates, and the like. Code of the API may provide for event registration and notification and management of event queue data structures. In an embodiment described herein, code of the API may provide functionality for event queue operations and may include code that executes in user and kernel mode for managing the event queue data structures. The particular API code executed in connection with an API invocation varies in accordance with whether the call is made from user or kernel mode.

Described in connection with FIGS. 3, 4, 5, 6, and 7 are APIs that may be included in an event queue API in an embodiment in accordance with techniques described herein. Included with each API below is a description of processing that may be performed in an embodiment. Additional detail regarding the processing and associated data structures is also described in more detail below in connection with figures other than FIGS. 3, 4, 5, 6, and 7.

Referring to FIG. 3, shown is an example of create and destroy APIs that may be used included in an embodiment of an event queue API. Element 310 describes the create API and element 320 describes the destroy API. As illustrated in 310, the create API may include the following parameters:

name—input parameter specifying the name of the event queue created;

private_data_size—input parameter specifying the size of private data record; and &handle_rv—output parameter specifying the handle to the event queue created with this invocation.

The create API may be used to create a named event queue as indicated by the first parameter, name. Optionally, the event queue may be created with an additional private data area used for communicating information between producers and consumers where each event posted may include additional private data having a size up to the size indicated by the second parameter, private_data_size. Code of the API may create the event queue and return a handle to the event queue created as indicated by the third parameter, &handle_rv.

As illustrated in 320, the destroy API may include a single input parameter, handle, specifying the handle of a previously created event queue which is destroyed as a result of the destroy API invocation. The input parameter handle may be the value of the parameter of a previous create API invocation. A destroy API call can either be made explicitly by a user code module running in user or kernel space, or as a result of performing clean up processing, for example, in connection with a container that has terminated.

Any container may execute the create and/or destroy APIs of FIG. 3. For example, the container executing the create and/or destroy APIs may subsequently be a producer and/or a consumer. Furthermore, an event queue may be created and/or destroyed by a container which is subsequently neither a producer or consumer.

Figure 4:
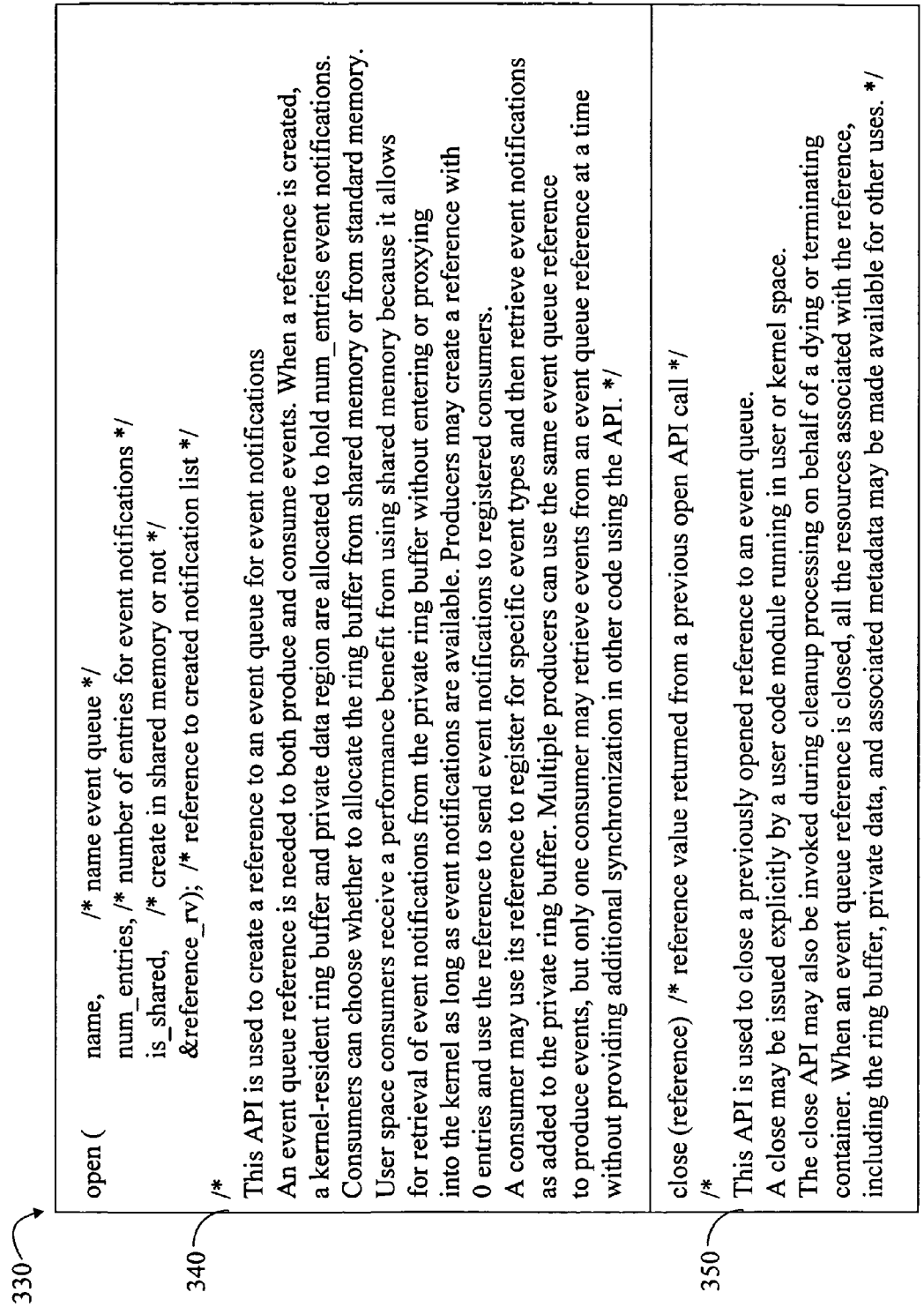

Referring to FIG. 4, shown is an example of open and close APIs that may be used included in an embodiment of an event queue API. Element 340 describes the open API and element 350 describes the close API. As illustrated in 340, the open API may include the following parameters:

name—input parameter specifying the name of the event queue to open for use by the invoking container;

num_entries—input parameter specifying the number of entries for event notifications;

is_shared—input parameter specifying whether to create data areas used for the event notification in shared memory or not; and &reference_rv)—output parameter specifying the reference to the event notification list created as a result of this invocation.

The open API may be invoked to create a reference structure (indicated by the fourth parameter) to an event queue (named by the first parameter) for event notifications. In an embodiment described herein, an event queue reference is needed to both produce and consume events. Thus the open API may be invoked by both producers and consumers of events. As will be described in following paragraphs in one embodiment when a reference is created using the open API call, a kernel-resident ring buffer and private data region are allocated to hold num_entries event notifications. In one embodiment described herein, the ring buffer may be the particular structure used to hold event notifications and may also be referenced herein as the event notification list. The foregoing ring buffer and private data region are associated with the created reference structure. On the open API invocation, the is_shared parameter may be used to identify whether to allocate the ring buffer from shared memory or from standard memory. As will be appreciated by those skilled in the art in light of further description set forth in following paragraphs, user space consumers may receive a performance benefit from using shared memory because it allows for retrieval of event notifications from the private ring buffer without entering or proxying into the kernel as long as event notifications are available. Producers may create a reference with 0 ring buffer entries and use the reference to send event notifications to registered consumers. A consumer may use its reference to register for specific event types and then retrieve event notifications as added to the private ring buffer. Multiple producers can use the same event queue reference to produce events, but only one consumer may retrieve events from an event queue reference at a time without providing additional synchronization in other code using the API.

As illustrated in 350, the close API may include a single input parameter, reference, specifying the reference to be closed as a result of the API invocation. The input parameter reference may be the returned value of the parameter, &reference_rv, of a previous open API invocation. A close may be issued explicitly by a user code module running in user or kernel space. The close API may also be invoked during cleanup processing on behalf of a terminating container. When an event queue reference is closed, all the resources associated with the reference, including the ring buffer, private data, and associated metadata may be made available for other uses.

Both event producer containers and event consumer containers may execute the open and close APIs of FIG. 4 in order to perform subsequent respective operations in connection with events for the named event queue.

Referring to FIG. 5, shown is an example of register_event and unregister_event APIs that may be used included in an embodiment of an event queue API. Element 380 describes the register_event API and element 390 describes the unregister_event API. As illustrated in 380, the register_event API may include the following parameters:

reference—input parameter specifying a reference value returned from a previous open API call; and event—input parameter identifying the event for which the reference, as may be used by a consumer container, is being registered.

The register API may be used by a consumer to register for a specific event identified by the event parameter. The event parameter may identify the event for which the consumer container is to be notified. The event parameter may be a value, structure, and the like, identifying the particular event. Upon occurrence of an event matching the event parameter, a notification is added to the event notification list identified by the reference parameter. Consumers may register for any number of different events. When a producer adds an event to an event queue (via add_events API call described below), every consumer that has registered for that event receives a copy of the event as notification by placing the notification on the notification list included in the consumer's reference along with any optional additional private data copied to the consumer's ring buffer.

As illustrated in 390, the unregister_event API may be used by a consumer to unregister for a specific event identified by the event parameter. Once an event has been unregistered, the consumer no longer receives copies of notifications for that event type in the consumer's ring buffer (as associated with the consumer's reference structure).

A container which is a consumer of events may execute the APIs of FIG. 5 in order to register and unregister regarding particular events for an event queue.

Referring to FIG. 6, shown is an example of an add_events API that may be used included in an embodiment of an event queue API. As illustrated in 400, the add_events API may include the following parameters:

reference—input parameter reference returned from previous open API call;

num_events—input parameter indicating the number of events to be added;

events[ ]—input parameter describing each of the one or more events being added;

private_data—input parameter that is a pointer to a private data area for the events added;

private_data_size—input parameter specifying the size of entire private data area;

qfull_policy—input parameter specifying a policy affecting producer/caller if consumer's event notification list (ring buffer);

&num_events_queued_rv—output parameter indicating the number of events queued by producer as a result of this invocation.

The add_events API may be used by a producer to add one or more events to an event queue. The producer may specify one or more events (as specified using the num_events and events[ ] parameters) and may include a pointer to a contiguous private data area (private_data parameter) containing the private data associated with those events. Any consumer currently registered for one of the events matching an event record included in the events parameter (array) receives a copy of that event in its ring buffer. If a producer encounters a condition where it is trying to add an event and one of the receiving consumers has a full notification list (ring buffer is full), the API handles the situation according to the qfull policy parameter specified by the producer in this API invocation. One embodiment may provide for 3 different (gull policies: PEND, OVERWRITE_OLDEST, and OVERWRITE_NEWEST. The PEND (pending) policy causes the producer to block if the API encounters a full event notification list. With the PEND policy, the producer is blocked until needed free slots in the list needed are available. The other two policies, OVERWRITE_OLDEST and OVERWRITE_NEWEST, cause the producer to overwrite, respectively, the oldest or newest entry in the queue.

Referring to FIG. 7, shown is an example of an get_events API that may be used included in an embodiment of an event queue API. As illustrated in 420, the get_events API may include the following parameters:

reference—input parameter identifying the reference output parameter returned from previous open API call;

max_events—input parameter indicating the maximum number of events to retrieve in this invocation;

events[ ]—structure or pointer to data area for holding event notifications retrieved;

private_data—pointer to data area for any private data also retrieved with the event notifications;

private_data_size—input parameter specifying the maximum amount of private data copied for each event retrieved;

timeout—input parameter indicating an amount of time for which the invoking container will wait (sleep) for an event notification if notification list is empty; and &num_events_rv)—output parameter indicating a number of events actually retrieved/consumed from ring buffer.

The get_events API may be used by a consumer to retrieve events and private data from the consumer's ring buffer associated with the reference parameter. Each consumer (per reference) has a ring buffer for event notification storage as previously allocated during an open API call. Each ring buffer can be allocated from either shared memory or from standard memory. If a ring buffer is allocated from standard memory, a U space consumer cannot access the ring buffer from user space and may use an RPC to proxy into the kernel to collect the events in the kernel. If the ring buffer is allocated from shared memory, a U space consumer can access the ring buffer producer/consumer indices as well as the event objects and private data directly from user space without proxying into the kernel. When using shared memory from a U space consumer, an RPC may be issued to the kernel to signal a waiting producer (as a result of consuming an event from a full ring buffer), or to wait for events (as a result of trying to consume an event from an empty ring buffer).

Figure 8:
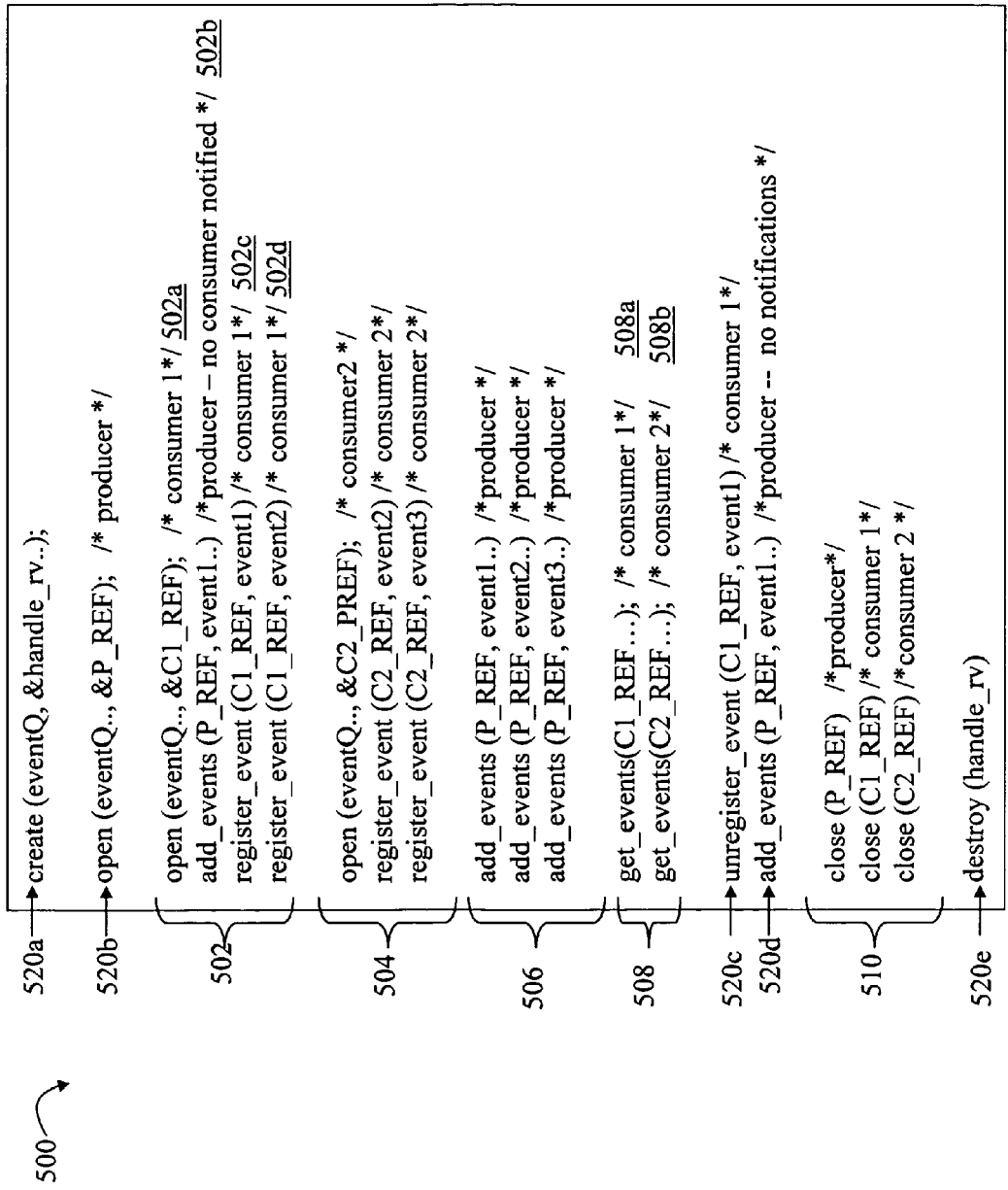
FIG. 8 is an example illustrating an invocation of the APIs by a producer and consumers in connection with an embodiment in accordance with techniques described herein.

Referring to FIG. 8, shown is an example illustrating a possible API invocation ordering by a producer and 2 consumers in accordance with techniques described herein. The example 500 includes a create API call 520a to create the named event queue, eventQ. It should be noted the API call of 520a may also be performed by any existing container. After the eventQ has been created, producers and/or consumers may execute open calls to obtain a reference to the named eventQ. Element 520b is an open API call made by a producer. Element 502 specifies a sequence of API calls that may be performed by a first consumer (consumer 1) and the producer (that executed the call 520b). Element 502a is a call by consumer 1 to open eventQ. Element 502b is a call by the producer to produce an event, event1. In connection with 502b, no consumers are notified regarding event1 since, although consumer 1 has executed an open API call, no consumers have registered for any events on eventQ. Consumer 1 registers to receive notifications regarding event1 and event2, respectively, using API calls 502c and 502d. Element 502 includes API calls made by consumer2 to open the eventQ and register to receive notification regarding occurrences of event2 and event3. Element 506 includes 3 API calls made by the producer regarding occurrences of event1, event2 and event3. It should be noted that the producer may alternatively perform a single API call to add_events and include event1, event2, and event3 in an array of events as described in connection with the add_events API call. As a result of 506a, a single event notification is posted on consumer1's ring buffer or event notification list. As a result of 506b, a single event notification is posted to the event notification lists for each of consumer 1 and consumer 2. As a result of 506c, a single event notification is posted to the event notification list for consumer 2. Element 508a is an API call made by consumer1 container to retrieve any event notifications posted to the eventQ for consumer1's handle indicated by C1_REF. Element 508b is an API call made by consumer2 container to retrieve any event notifications posted to the eventQ for consumer2's handle indicated by C2_REF.

Element 520c unregisters consumer1 with respect to receiving subsequent notifications for event1 occurrences. Element 520d is executed by the producer and posts event notification regarding the event1 occurrence to any registered consumers. In this example, execution of the API call of 520d does not result in any event notifications to any consumers since none are currently registered. Element 510 illustrates API calls performed, respectively, by the producer, consumer1 and consumer 2 to close each invoking container's reference to eventQ. Element 520e illustrates an API call that may be performed by the producer, consumer1, consumer 2, or some other container to destroy the event queue instance (denoted as eventQ in this example).

What will now be described are various data structures that may be utilized in an embodiment in connection with implementation of event queues using the foregoing event queue API.

Figure 9:
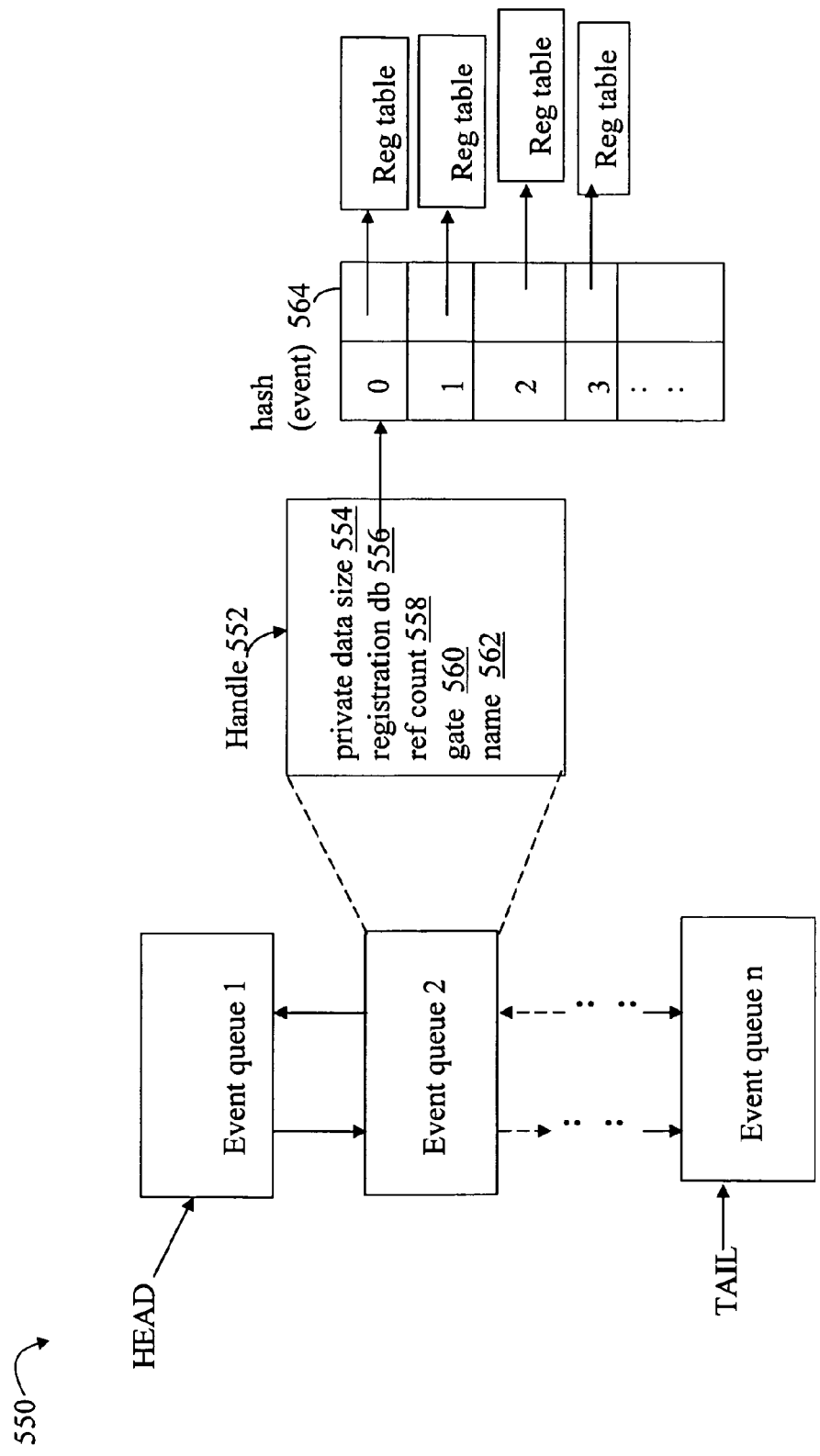

Referring to FIG. 9, shown is an example of a list of event queue structures that may be created and maintained in kernel space for use in connection with the techniques described herein. The example 550 includes a list of event queue structures having a first entry denoted by HEAD pointer and a last entry denoted by the TAIL pointer. Each entry on the list may correspond to a single event queue created as a result of executing the create event queue API described in FIG. 3. Each entry on the list of event queue structures may be referred to as a handle structure created and specified as the handle_rv parameter of the create API call. Element 552 illustrates in more detail different fields that may be included in the handle structure for each event queue created. Element 552 may include a private data size 554, registration database (db) 556, ref count 558, gate 560 and name 562. The private data size 554 may be an integer quantity indicating the maximum size of the private data for each event notification posted for a consumer. The value of 554 may be as specified in the create API call. The registration database (db) 556 may be a pointer to a registration database of registered events and denote which consumer containers (e.g., references used by particular containers having previously executed the register API call for events) are notified upon the occurrence of particular events as posted by a producer (e.g., using the add events API call). In one embodiment, the registration database may be implemented using a hash table 564 which maps a hash value for a particular event to a registration table (regtable) for that event. Regtables are described in more detail in following paragraphs and figures and identify a list of references registered for a particular event. It should be noted that multiple events may result in a same hash value so that there may be multiple regtables for each hash entry although the example illustrates only a single regtable with each hash entry. Ref count 558 may be an integer value indicating a number of current users of the event queue. Ref count 558 may be used in an embodiment in connection with event queue maintenance, for example, to detect when event queue handle structures and resources may be made available for other uses. Gate 560 represents a locking mechanism structure that may be used to synchronize use of the registration db for registration and unregistration of events. In one embodiment, the gate 560 may represent a structure including a mutex and a spinlock used for synchronizing access to the registration db and other fields of the gate structure itself The gate 560 and its use is described in more detail in following paragraphs. The name 562 may be string specifying the name of the event queue. The value of 562 may be as specified in the create API call.

An instance of 552 may be created as a result of invocation of the create API. In one embodiment, execution of the create API may also create the hash table 564 which is not mapped to any regtable instance since there are currently no events registered for the event queue when the create API is performed. A pointer to an instance of 552 may be returned as the &handle_rv parameter of the create API.

It should be noted that the structures of 550 may be kernel resident structures maintained by API code executing in kernel space. Thus, a producer and consumer executing in user space may proxy into the kernel to perform operations using the event queue structures as needed. API code executing in user space may also create and manage additional data structures to track handles and other information of kernel space data structures. Such information may be used when making calls into kernel space. This is described in more detail in following paragraphs.

Particular structures described herein are included for purposes of illustrated exemplary structures that may be utilized in an embodiment and should not be construed as limited to those herein as will be appreciated by those skilled in the art.

Figure 10:
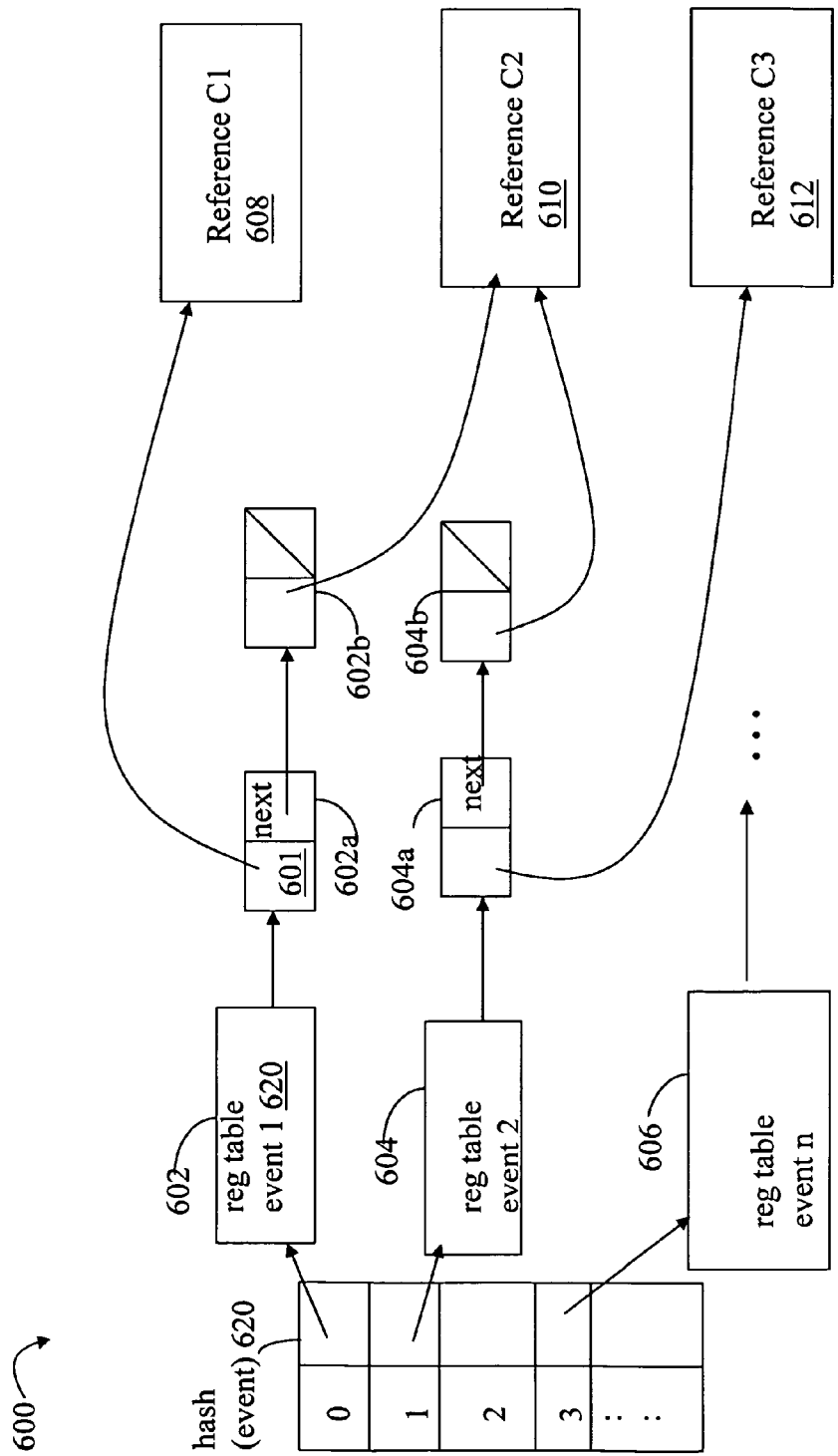

Referring to FIG. 10, shown is an example illustrating how a registration database (registration db) may be implemented in an embodiment in accordance with techniques described herein. The example 600 provides additional detail regarding the structure 564 and associated registration tables (reg tables) of FIG. 9. Hash table 620 indicates that one or more consumers have registered for event 1, event 2 and event n. In particular with respect to event1 and event2, the example 600 indicates that consumer C1 is registered for event1, consumer C2 is registered for event1 and event2, and consumer C3 is registered for event2. In this example, hash table entry 0 is mapped to event 1 as indicated by the reg table 602 associated with hash table entry 0. Hash table entry 1 is mapped to event 2 as indicated by the reg table 604 associated with hash table entry 1. Hash table entry 3 is mapped to event n as indicated by the reg table 606 associated with hash table entry 3. The reg table may include a list of entries where there is an entry on the list for each consumer that has registered to receive the event associated with the reg table. The reg table 602 may include a first field 620 which identifies the associated event, event 1, and a second field identifying the list of entries for registered consumers of event 1. Element 602a represents an entry on the reg table list of registered users and may include a first field 601 which points to a reference structure for the registered consumer C1 608 and a next pointer to the next entry 602b. Element 602b similarly includes a first field pointing to the reference C2 610 for consumer C2 and the next field is null since there is no next entry in the list of 602. The reg table 604 has a list of 2 registered consumers as indicated by entries 604a (consumer C3) and 604b (consumer C2).

Elements 608, 610 and 612 are created, respectively, as a result of consumers C1, C2, and C3 each executing the open API. Elements 602a, 602b, 604a and 604b are created respectively as a result of consumers C1, C2, C3 and C2 executing the register_event API. It should be noted that the first consumer to register for an event may also result in the creation of 602, link between 620 and 602, and other data items that may be used in maintaining the list of registered event consumers. An example of a reference structure that may be used in an embodiment is described in more detail below.

Figure 11:
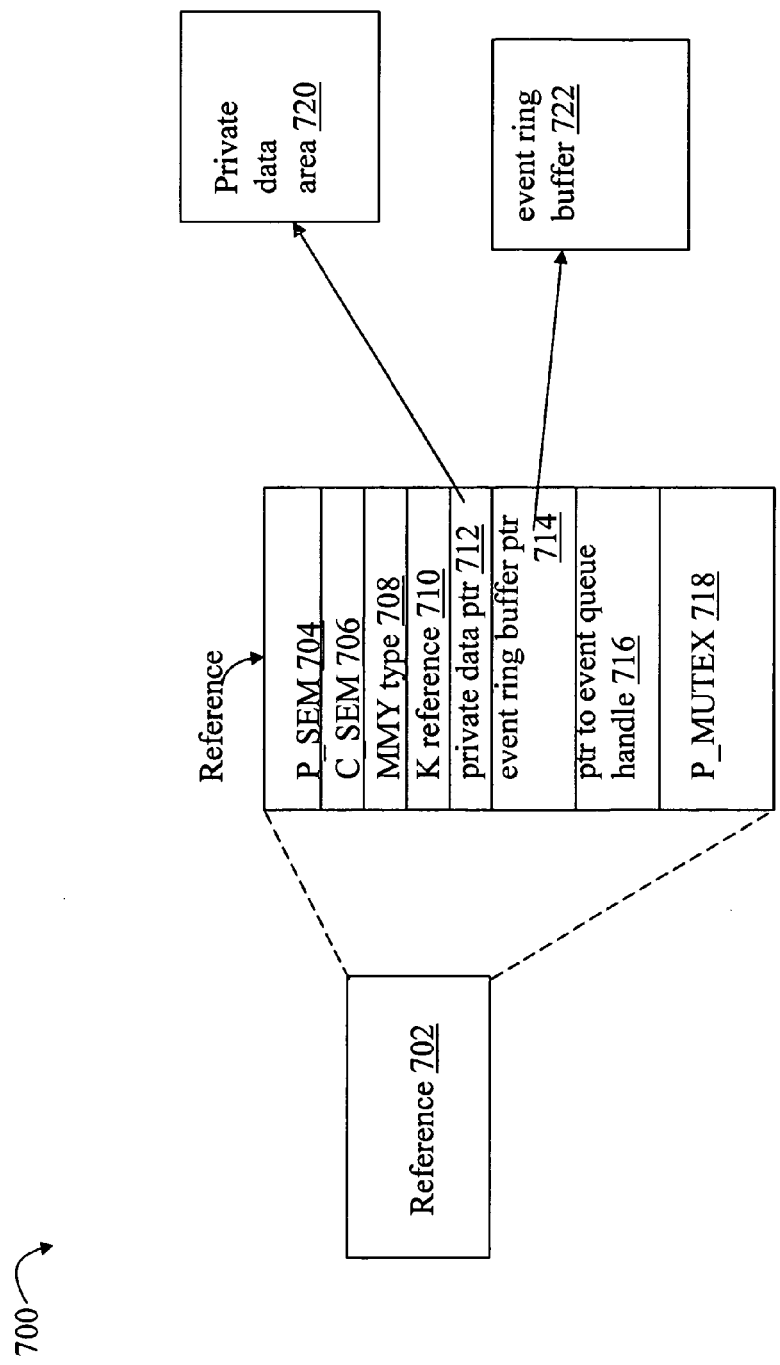

Referring to FIG. 11, shown is an example 700 illustrating in more detail fields that may be included in an embodiment of the reference structure created as a result of executing the open API described herein. Each reference structure 702 may include the following fields: P_SEM 704, C_SEM 706, MMY type 708, K reference 710, private data ptr 712, event ring buffer (pointer) ptr 714, ptr to event queue handle 716, and P_MUTEX 718. P_SEM 704 may be a semaphore used to block an executing producer waiting for an empty entry in the ring buffer (event notification list associated with 714 and 722) when full. C_SEM 706 may be semaphore used to block an executing consumer waiting for an event notification to be posted to the ring buffer (event notification list) when empty. It should be noted an embodiment may utilize other API calls in connection with the semaphores, such as P_SEM and C_SEM, and other synchronization primitives and associated operations as described, for example, in U.S. patent application Ser. No. 12/079,648 (the '648 application), filed Mar. 28, 2008, COMMON SCHEDULING AND SYNCHRONIZATION PRIMITIVES, which is incorporated by reference herein. Alternatively, an embodiment may choose to utilize other techniques in connection with implementing the foregoing semaphores and other synchronization primitives and related operations.

MMY type 708 may denote the type of memory from which storage for the private data area 720 and event ring buffer 722 is allocated. Element 708 may denote a type of memory in accordance with the is_shared parameter of the open API. K reference 710 may be used in user space only to identify the address of a reference in kernel space. Thus, an embodiment of user space API code may create a user-space instance of the reference 702 and also include in that user space structure an address to the corresponding kernel space structure. Private data ptr 712 is an address or pointer to a portion of storage used as the private data area 720. As described herein, the private data area 720 may be used to communicate additional private data for each event between producers and consumers (from producer to a consumer). Event ring buffer (pointer) ptr 714 may be a pointer to a ring buffer 722 used as an event notification list. The event notification list may include an entry for each posted event notification for the consumer using the reference 702. As described in more detail below, the ring buffer 722 may be managed as a lockless ring buffer of entries. Ptr to event queue handle 716 may be a pointer to the handle for the event queue associated with this reference. Element 716 may point to an instance of a handle structure 552 as illustrated in FIG. 9. P_MUTEX 718 (also referred to as a producer mutex herein) may be a mutex used within the add_events API code to synchronize or serialize access to the reference structure of a consumer with other producers. In particular, the P_MUTEX may be used in connection with synchronizing or providing serialized access to a consumer's event notification list by producers. An embodiment may utilize the API described in the '648 application as well as other techniques in connection with the mutex P_MUTEX.

It should be noted that the size of the private data area 720 may be determined in accordance with the private_data_size parameter of the create API and the num_entries parameter of the open API (e.g., size of 720 may be equal to the product of private_data_size and num_entries).

Figure 12:
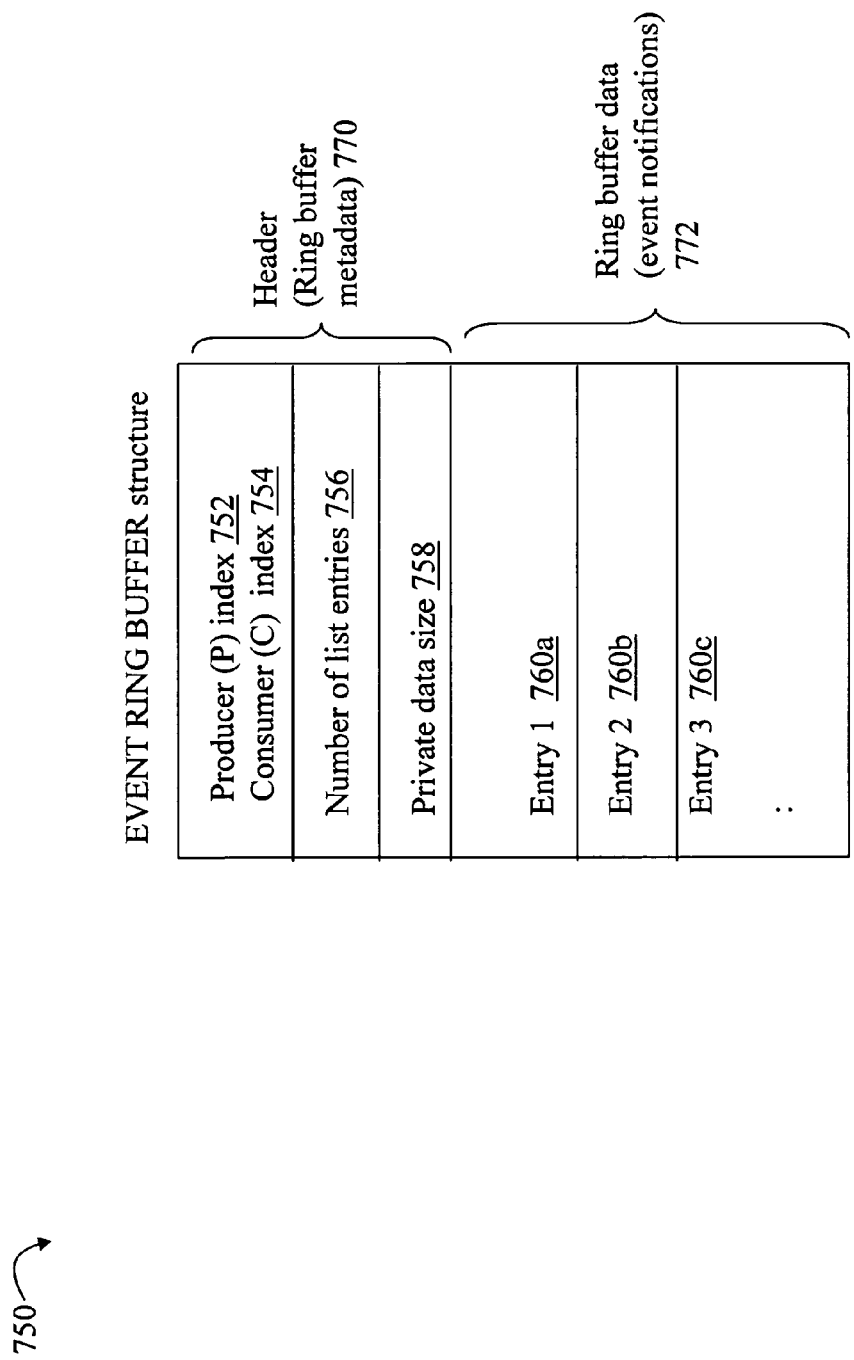

Referring to FIG. 12, shown is an example illustrating in more detail an event ring buffer structure that may be used in an embodiment in accordance with techniques herein. The example 750 illustrates element 722 in more detail. The example 750 may include a header portion 770 with ring buffer metadata and a data portion or data area 772 including the ring buffer data (e.g., event notifications). The header 770 may include a producer (P) index 752, a consumer (C) index 754, number of list entries 756 and private data size 758. Element 752 may indicate the ring buffer index of the next event notification entry for use by the producer. If the event notification list (e.g., ring buffer) is not full (e.g., has available or free entries), element 752 may indicate the next free entry; otherwise element 752 may indicate the next entry to be used by a producer (in accordance with the qfull policy described elsewhere herein) where the next entry currently contains an unconsumed notification. Element 754 may indicate the ring buffer index of the next event notification in the list for a consumer to consume if the event notification list is not empty. If the event notification list is empty, element 754 may indicate an empty entry or an event notification that has already been consumed. Element 756 may indicate a maximum number of entries in the ring buffer (e.g., maximum number denoting the ring buffer notification capacity). Element 758 may indicate an amount of private data used for storing private data for a single event notification. Each event notification may be included in a portion of storage of 772 as illustrated.

Referring to FIG. 12A, shown is an example of an event entry that may be used in an embodiment in connection with techniques herein. The example 780 identifies information that may be included in an event entry structure used in connection with the event parameter of the register_event, unregister_event, add_events and get_events API calls. An instance of the event entry structure of 780 may be included as an entry in the ring buffer or event notification list as described above. For example with reference to FIG. 12, an instance of an event notification may correspond to 760a so that 760a may include the information of the example 780. An instance of the event entry structure of 780 may be specified for each event occurrence to be posted for the add_events API call. The event entry of 780 may include an event type, event id and user context information. The event type and event id may be used in combination to uniquely represent each event. The event type and event id may vary with each embodiment in accordance with the particular events to be represented. User context may represent a relatively small data area used to communicate user specified data for an event occurrence. The size of user context may vary with embodiment. It should be noted that the private data area may be used in an embodiment if the size of user context is insufficient to facilitate communicating data from a producer to event consumers.

Figure 13:
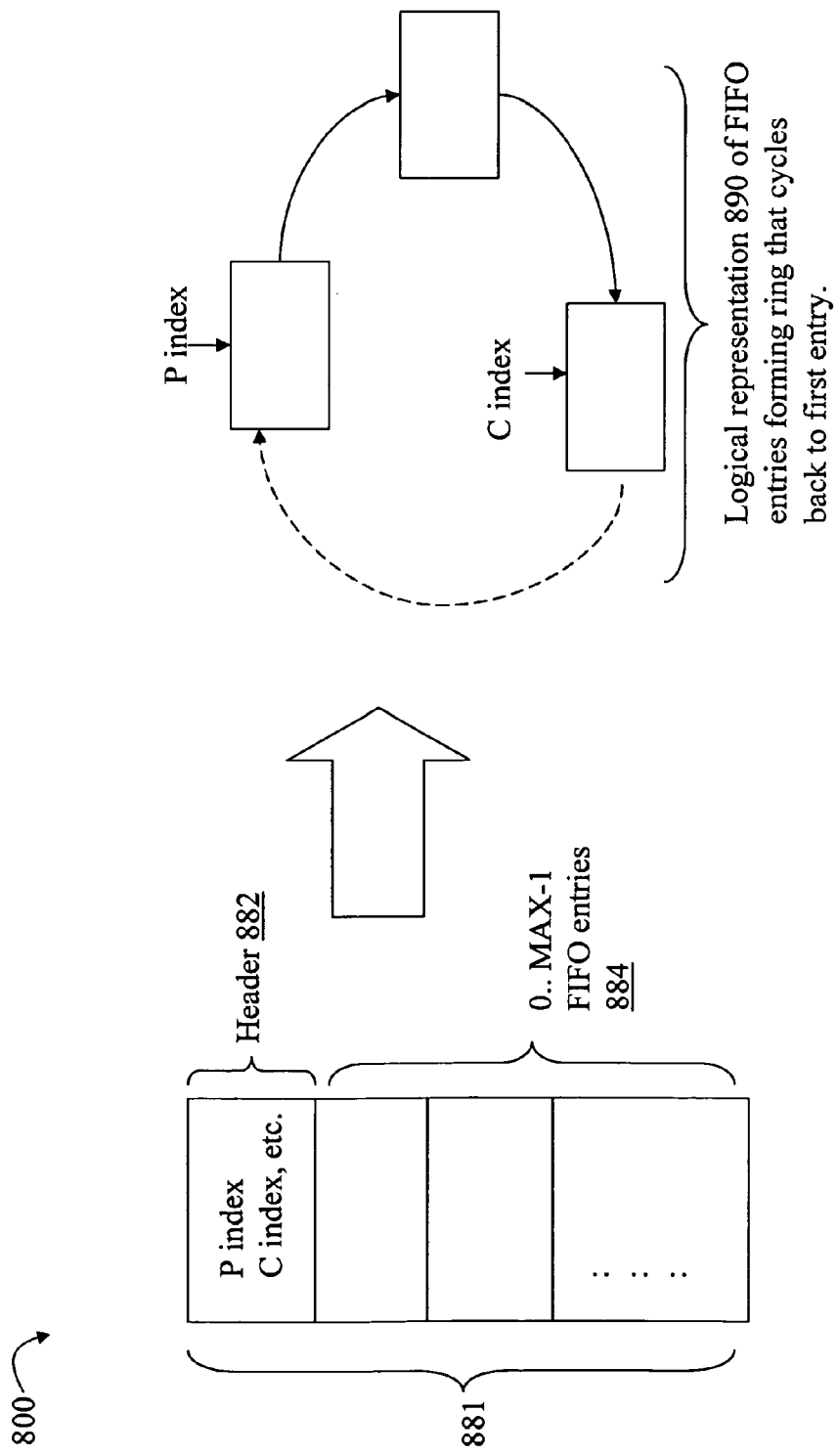

Referring to FIG. 13, shown is an example illustrating in more detail how each of the ring buffers used for event notification lists may be implemented in an embodiment. The example 800 includes a first representation of the ring buffer 881 that includes a header 882 followed by a number of entries 884. Element 881 corresponds to the structure 750 of FIG. 12 described above. Element 890 illustrates a logical representation of the ring buffer entries 884 which may be characterized as a FIFO (first in first out) data structure where the entries form a ring or circular buffer. When the last FIFO entry (entry MAX-1) of 884 is reached in processing, processing then cycles back to the first entry (FIFO entry 0). As will be appreciated by those skilled in the art, there are a variety of different ways in which the ring buffer described herein may be implemented in a lockless fashion (that is without using native operating system locks to synchronize access to the ring buffer).

Described in following paragraphs are logical steps of a consumer (reader of entries) and a producer (write of the entries) that may be performed in one embodiment to utilize the ring buffer in connection with the event queue APIs herein. As will also be described in processing of following paragraphs, an embodiment may use a hardware primitive or instruction that may available to perform an atomic compare and swap operation or CAS. The CAS operation may described using three operands—a memory location (V), the expected old value (A), and a new value (B). The processor will atomically update the location V to the new value if the current value stored in V matches the expected old value, otherwise it will do nothing. In either case, the value that was stored in the location V prior to the CAS instruction may be returned. The CAS may be used to execute a read-modify-write sequence without fear of another thread modifying the location V in the meantime, because if another thread did modify V, the CAS would detect it (and fail) and the algorithm could retry the operation. The way in which the CAS operation is implemented may vary with embodiment. It should be noted that the CAS instruction may be used in an embodiment in connection with updating P index and C index values at the same time as described below in more detail. An embodiment may also use other techniques in connection with ensuring that the foregoing values are updated simultaneously.

In an embodiment in which the event queue API is implemented using the RPC facility, and the RPC facility is built on top of, and utilizes, the lower level inter-module or inter-container communication mechanism and techniques to facilitate communication between two code modules in different containers as described in the '759 and '822 patent applications, communications from a U-mode container to a K-mode container may form a command path including a request path originating from the event queue API invocation (starting point) to the event queue API code executing in K mode (ending point), and a return path from ending point back to the starting point. The command path may be characterized as a runtime path or call chain between starting point and the ending point. The call chain may include multiple invocation layers of routines including user code, and one or more API routines of the inter-module or inter-container API, RPC API and event queue API as described herein. It should be noted that one or more layers may be included in the command path and associated call chain above the event queue API layer (e.g., where another user code module makes calls to API code using the event queue API described herein).

Figure 14:
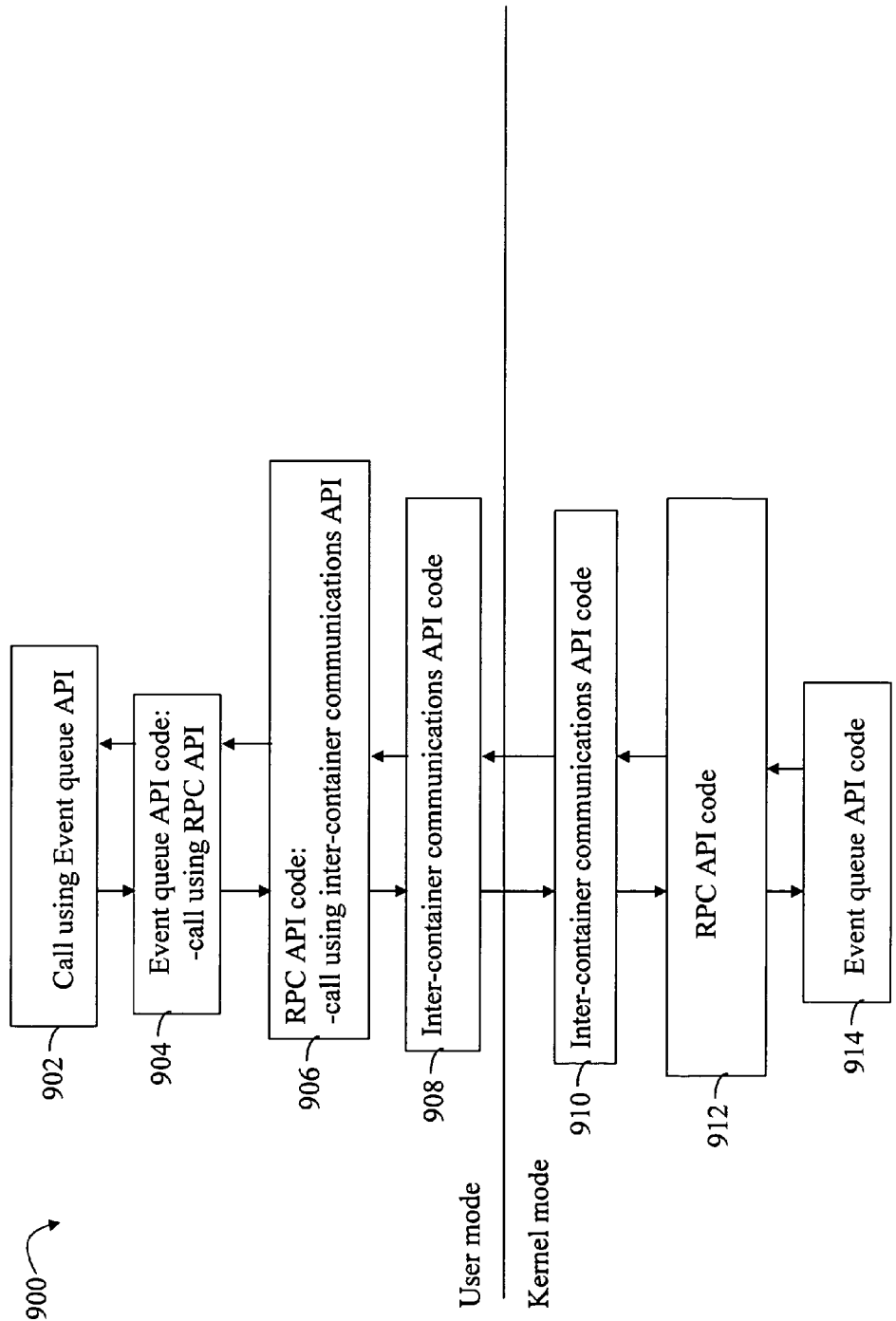
FIG. 14 is an example illustrating a call chain in an embodiment in accordance with techniques herein.

Referring to FIG. 14, shown is an example illustrating multiple invocation layers as may be included in a command path in accordance with techniques herein. The example 900 illustrates a runtime call chain as may result when an event producer or consumer is a U mode container and includes a call using the event queue API 902. The runtime call chain illustrated in the example 900 may include a first call 902 into event queue API code of 904. The API code for the event queue of 904 may include an RPC API call, such as to perform an' operation in connection with the event queue structures which are kernel resident. The RPC API call of 904 may result in a transfer of control to the appropriate RPC API code portion 906. An embodiment may use the RPC API as described in the RPC patent application. The code of 906 may then issue further API calls using inter-container communications API as described in the '759 and '822 applications resulting in a transfer of control to other API code of 908. In one embodiment, the layer 908 may be characterized as a lower layer in the call chain on the U mode side and a command may then be issued to proxy into kernel space resulting in a transfer of control to code of 910. For example, an exec-handler executing in kernel space may be included in 910 which receives a command request from an execute code module executing in user space as may be included in 908. From the layer 910, control may be transferred to a kernel mode portion of the RPC API code 912 and then subsequently to the event queue API code 914 executing in kernel mode. It is the code of 914 that may perform the requested operation for implementing the event queue API call of 902 by accessing the appropriate kernel resident event queue structures described herein. Any data that is to be returned to the starting point 902 may be propagated back up the call chain on the return path also illustrated.

As set forth in more detail in following paragraphs and figures with the event queue API described herein, an API may be invoked in user space or kernel space having a same name and same defined interface. In user space, API code may package up the input parameters and other parameter information (e.g., necessary metadata for command and parameters), communicate this information to kernel mode code (such as the exec-handler) which then invokes a K space RPC level kernel handler for the event queue (e.g. event queue handler). This latter K space handler may then invoke the same named API on the kernel side for processing. The foregoing may be performed as a general technique as appropriate for user space API code as described below. Thus, the foregoing general paradigm for a user space event queue API packages parameter information and transmits the parameter information to the kernel using the RPC API to invoke a K space event queue handler. The K space event queue handler then invokes the K space event queue API corresponding to the U space event queue API initially invoked. As described in more detail in following paragraphs and figures, an embodiment of the user space API code may include an optimization which varies from the general paradigm just described when the ring buffer (or other event notification list structure) and private data area (if any) are implemented using shared memory accessible to both user space and kernel space.

It should be noted that the parameter information for the input and output parameters for the event queue API described herein may utilize the techniques described in the RPC patent application for propagating parameter information from the event queue API code at layer 904 to the kernel side. As described in the RPC patent application, a message transport technique may be used where each layer in the call chain on the client side may pass its parameter information in the form of an embedded list. For example, a calling routine may construct a structure including its parameter information and parameter information received from a calling routine. The parameter information from the calling routine may be linked or chained into the called routine's structure via a pointer to the parameter information passed from the calling routine. At the bottom most level in user mode as represented by 908, the collective or aggregate parameter information may be encoded and transmitted to code in the kernel for processing. Similarly, an embodiment may also use the techniques described in the RPC patent application for unmarshalling or decoding the parameter information when control is returned to the user mode. Using this technique to pass parameter information between user and kernel space may be used in an embodiment to avoid excessive data copying at different levels in the call chain.

The code of 914 may operate on the kernel resident data structures such as illustrated and described above such as, for example, in connection with FIGS. 9, 10, 11, and 12. As also noted above, the ring buffer used for event notification may be in shared memory so that it is directly accessible to both user space code and kernel space code. As described in more detail elsewhere herein, use of shared memory may provide an advantage to a user space consumer in that the user space consumer may access the event notification list from user space without proxying into the kernel. When user mode API code requires access to the kernel resident event queue structures, the user space code may proxy into the kernel to perform the operations using the kernel resident event queue structures. Such code may be included in kernel code of the API described herein in an embodiment.

What will now be described is logical processing that may be performed by code of the API in connection with implementing the event queue API described herein.

Figure 15:
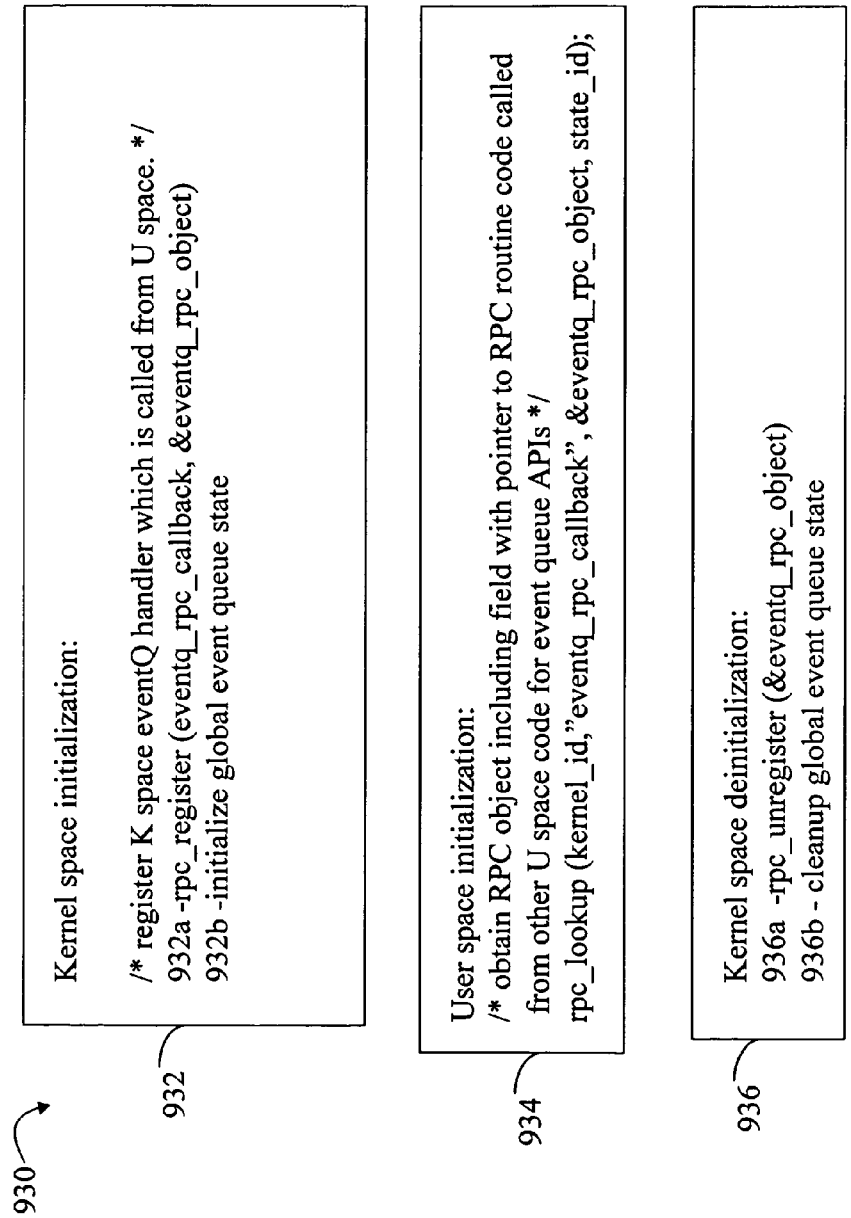

Referring to FIG. 15, shown is an example of logical processing that may be performed as part of initialization and de-initialization processing. Elements 932 and 934 may be performed as part of initializing, respectively, the kernel container and each user container with the event queue API described herein. Similarly, the element 936 describes processing that may be performed as part of deinitializing the kernel container for use with the event queue API described herein.

Element 932 includes steps 932a and 932b. At step 932a, the RPC API is used to register kernel space code, the eventq_rpc_callback, which is invoked from user space code implementing the event queue API. The foregoing callback may refer to kernel space code included in a layer (e.g., such as denoted by element 914 of FIG. 14) in the call chain on the kernel side. At step 932b, initialization of the event queue data structures for the event queue state may be performed. Step 932b may include, for example, creating and initializing related to the structures described herein such as FIG. 9. For example, step 932b may include creating the head pointer and tail pointers and initializing the foregoing to null since no event queues have been created at this point. With reference to element 934 in an embodiment using the RPC API, 934 may include invoking the rpc_lookup API to obtain the eventq_rpc_object and state_id when using the rpc_call FAST API (as described in the RPC patent application) in later processing. With reference to element 936, included are steps 936a and 936b. At step 936a in an embodiment using the RPC API, the rpc_unregister API call may be invoked to unregister the kernel code previously registered in step 932a. At step 936b, processing may be performed to cleanup any event queue state information such as, for example, related to the structures described above.

Referring to FIG. 16, shown is an example of logical processing that may be performed in connection with implementing the create event queue API described herein. The example 950 includes a first portion 960 describing steps performed in connection with implementing the user space version of the create API. The example 950 also includes a second portion 980 describing steps performed by kernel space code implementing the create API.

Element 960 includes step 962 where a user space handle for the event queue is allocated an initialized. In one embodiment, a user space instance of the handle structure of FIG. 9 may be allocated and initialized. Additionally, an embodiment may also maintain information for a list of these handles for all event queues in user space as also illustrated in FIG. 9 in order to facilitate calls to kernel space to utilize the kernel resident structures. Steps 964, 966, 968 and 970 relate to processing to prepare parameter information for a call to proxy into the kernel where code of the kernel performs processing to create the kernel resident handle in accordance with the parameters of the user space create API invocation. Step 972 uses the RPC API routine rpc_call FAST to proxy into the kernel to perform the necessary processing for the create event queue API. It should be noted that the rpc_call FAST includes second and third input parameters using values obtained from the previous rpc_lookup RPC API call of FIG. 15. Step 974 indicates that control is transferred to kernel space code, the kernel space handler eventq_rpc_callback in this example, which performs processing of steps 974a and 974b. It should be noted that processing described in steps 974a and 974b may be performed by part of a larger body of kernel space code of the eventq_rpc_callback although 974*a* and 974*b* are illustrated inline in this example. For example, the eventq_rpc_callback may include code which implements steps 974*a* and 974*b* as well as other code for other logical processing steps described herein. The eventq_rpc_callback may include a large switch or case statement with a different case for each of the user space event queue API cases. The particular case corresponding to the processing to be performed may be identified in the input parameters of input msg_list. For example, a tag field of a message list as described in the RPC patent application may denote a value of a command code used in selecting a particular case and associated processing in the event_q_rpc_callback code of the API.

At step 974*a*, the input and output parameters are deconstructed or extracted from the parameter information received on the kernel side and the kernel space create API code of 980 is invoked. At step 974*b*, the kernel space handler performs processing to pass the output parameters from the RPC to user space (processing continues in user space to the point subsequent to the rpc_call FAST invocation from step 972). At step 976, the user space code for the create API returns to the caller that invoked the create event queue API. The handle returned may be the user space handler. Although not specifically pointed out, element 960 may also include initializing fields of the user space handle structure to include information returned from the rpc_call FAST. For example, the user space handle structure may include a field (e.g., a pointer) which identifies the kernel handle structure. When subsequent API calls are made in user space, the user space API code may obtain the kernel space handle when provided with the corresponding user space handle.

Element 980 describes logical processing for the kernel space API code of the create API. As described above, processing of 980 may be performed as a result of invoking the create API in connection with the RPC call of step 972 (where the kernel space create API is invoked by the kernel space handler at step 974*a*), or as a result of other kernel code that includes a create API call. At step 981, a determination is made as to whether the named event queue already exists. If so, step 981 indicates that an appropriate status may be returned. Otherwise, processing continues with step 982 where the kernel space handle structure is allocated, added to the global list of event queues (at step 984), and initialized (in steps 986 and 988). At step 990, the K space handler is returned to the caller.

Figure 17:
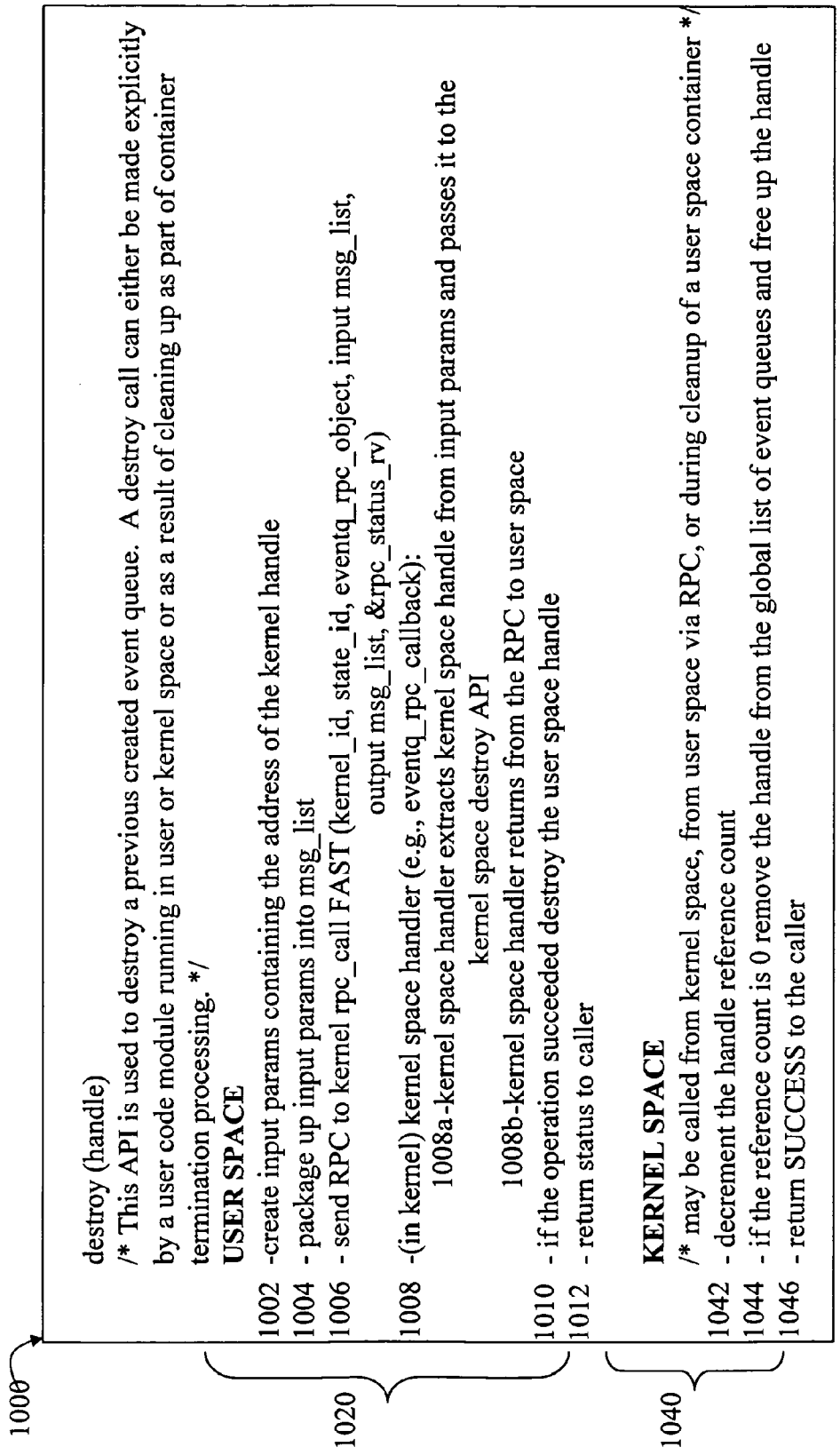

Referring to FIG. 17, shown is an example of logical processing that may be performed in connection with implementing the destroy event queue API described herein. The example 1000 includes a first portion 1020 describing steps performed in connection with implementing the user space version of the destroy API. The example 1000 also includes a second portion 1040 describing steps performed by kernel space code implementing the destroy API.

Element 1020 includes steps 1002 and 1004 which describe processing to prepare parameter information for a call which proxies into the kernel. Code of the kernel performs processing to destroy the kernel resident handle in accordance with the parameters of the user space destroy API invocation. Similar to step 972 of FIG. 16, step 1006 uses the RPC API routine rpc_call FAST to proxy into the kernel to perform the necessary processing for the destroy event queue API. Step 1008 indicates that control is transferred to kernel space code, the kernel space handler eventq_rpc_calback in this example, which performs processing of steps 1008*a* and 1008*b*. It should be noted that, as described in connection with steps 974*a* and 974*b* of FIG. 16, processing described in steps 1008*a* and 1008*b* may be performed by part of the larger body of kernel space code of the eventq_rpc_callback although illustrated inline in this example. At step 1008*a*, the input and output parameters are deconstructed or extracted from the parameter information received on the kernel side and the handler invokes the kernel space create API code of 1040 which then returns. At step 1008*b*, the kernel space handler returns from the RPC to user space. At step 1010 in the user space destroy API code, a determination is made as to whether the operation was successful, and if so, the user space handle as maintained in user space is destroyed (e.g., the associated storage may be deallocated or otherwise made available for other use). In step 1012, a status regarding the destroy API processing is returned to the caller.

Element 1040 describes logical processing for the kernel space API code of the destroy API. As described above, processing of 1040 may be as a result of invoking the destroy API in connection with the RPC call of step 1006 (where the kernel space destroy API is invoked by the kernel space handler at step 1008*a*), or performed as a result of other kernel code that includes a destroy API call. At step 1042, the handle reference count (of the kernel resident structure) is decremented. At step 1044, a determination is made as to whether the reference count is 0. If so, step 1044 includes removing the handle from the global list (e.g., list of FIG. 9) so that the storage associated with the handle structure may be made available for other uses. At step 1046, a success status is returned to the caller.

Referring to FIG. 18, shown is an example of logical processing that may be performed in connection with implementing the open event queue API issued from user space.

At step 1052, an instance of a user space reference structure is allocated and may be included in a list of other user space references or other suitable user space structures that may be maintained in an embodiment. Steps 1054, 1056, 1058 and 1060 describe processing to prepare parameter information for a call which proxies into the kernel where code of the kernel performs processing to create a reference in accordance with the parameters of the user space open API invocation. Similar to that as described above in connection with other figures, step 1062 uses the RPC API routine rpc_call FAST to proxy into the kernel to perform the necessary processing for the open event queue API. Step 1064 indicates that control is transferred to kernel space code, the kernel space handler eventq_rpc_calback in this example, which performs processing of steps 1064*a*, 1064*b* and 1064*c*. As also described in connection with other figures, steps 1064*a-c* may be performed by part of the larger body of kernel space code of the eventq_rpc_callback although illustrated inline in this example. At step 1064*a*, the parameter information received on the kernel side by the handler is extracted and passed to the kernel space open API. Once control returns to the kernel space handler at step 1064*b*, the kernel space handler performs processing to pass the output parameters from the RPC to user space (processing continues in user space to the point subsequent to the rpc_call FAST invocation from 1062). At step 1064*b*, the kernel handler stores the kernel reference, and if the event notification list is implemented using shared memory, the physical address of the ring buffer and its size, as output parameters. At step 1064*c*, the kernel space handler returns from the RPC to user space. At step 1066, a determination is made as to whether the ring buffer is implemented with shared memory. If so, processing is performed to map the shared memory portion for the ring buffer and private data areas into the user space address of the U container that invoked the open API. At step 1068, the address of the kernel space reference structure may be stored as a field in the user space reference structure allocated in step 1052. At step 1070, control is returned to the caller.

Referring to FIG. 19, shown is an example of logical processing that may be performed in connection with implementing the kernel version of the open event queue API. As described above, the code of 1100 may be invoked from user space via a RPC in connection with a user space open API call, or from kernel space directly from other code including the open API call. At step 1152, the named event queue is looked upon the global list of event queues. Step 1152 may include determining whether there is an entry already in the global event queue list (such as illustrated in FIG. 9 for a kernel resident structure) by comparing the name parameter to the name field of each handle structure. If no matching entry in the event queue list is found, step 1152 includes returning a corresponding status. Otherwise, control proceeds to step 1154 where a kernel reference structure is allocated and initialized in step 1156. At step 1158, a calculation may be performed to determine the amount of space needed for the ring buffer and the private data regions. Step 1158 includes allocated the storage for the foregoing from either shared or standard memory in accordance with the is_shared input parameter. At step 1160, the refcount field of the event queue handle structure is increment. At step 1162, the kernel reference is returned to the caller.

Referring to FIG. 20, shown is an example of logical processing that may be performed in connection with implementing the close event queue API issued from user space. At step 1152, a determination is made as to whether the ring buffer and private data areas are implemented using shared memory. If so, the shared memory region is unmapped from the user space container's address space. Steps 1154 and 1156 describe processing to prepare parameter information for a call which proxies into the kernel where code of the kernel performs processing in accordance with the parameters of the user space close API invocation. Similar to that as described above in connection with other figures, step 1160 uses the RPC API routine rpc_call FAST to proxy into the kernel to perform the necessary processing for the close event queue API. Step 1160 indicates that control is transferred to kernel space code, the kernel space handler eventq_rpc_calback in this example, which performs processing of steps 1160a and 1160b. As also described in connection with other figures, steps 1160a-b may be performed by part of the larger body of kernel space code of the eventq_rpc_callback although illustrated inline in this example. At step 1160a, the parameter information received on the kernel side by the handler is extracted and passed to the kernel space close API. Once control returns to the kernel space handler at step 1160b, the kernel space handler returns from the RPC to user space. At step 1162, the user space reference structure may be deallocated and made available for other uses. At step 1164, control returns to the caller.

Referring to FIG. 21, shown is an example of logical processing that may be performed in connection with implementing the kernel version of the close event queue API. As described above, the code of 1200 may be invoked from user space via an RPC in connection with a user space close API call, or directly from other code executing in kernel space. At step 1202, a next waiting consumer, if any, may be awakened if waiting on the C_SEM of the reference structure. Additionally, step 1202 may include processing to ensure that the consumer does not attempt to wait on the semaphore again. For example, an embodiment may set a flag or other state information to communicate with a consumer not to wait on the semaphore. At step 1204, seal gate processing is performed. Seal gate processing, and its complementary operation of unseal gate processing, are described in more detail in following paragraphs. Seal gate processing wakes up any waiting producers which are waiting on the P_SEM of the reference structure due to the pending policy in the add_event API when there are no available entries in the ring buffer to post event notifications. Seal gate processing is performed to wake up any such waiting producers to place them outside the logical gate formed using the gate structure. At step 1206, the registration tables in the registration database for this event queue handle are traversed and any registration entries associated with this reference are removed. At step 1208, unseal gate processing is performed to effectively re-open the gate and allow other producers back in to utilize the registration database structure as needed. At step 1210, cleanup processing for the reference metadata is performed. Step 1210 may include, for example, destroying or deallocating semaphores, a mutex, and the like, of the reference structure. At step 1212, ref count field of the handle (of the event queue associated with this reference structure) is decremented. At step 1214, a determination is made as to whether the ref count is 0. If so there are no current users of the event queue as indicated with the event queue handle structure's ref count=0, the handle may be removed from the global list of event queues. Storage associated with the remove handle structure may be made available for other uses. At steps 1216 and 1218, processing may be performed to also make available other storage, for example, associated with the ring buffer and kernel space reference structure. At step 1220, control is returned to the caller.

As will be described in more detail below, the operations of seal gate and unseal gate may be performed by those modifying the registration database and registration tables associated with an event queue handle. The operations of seal and unseal gate are used to synchronize access to the registration database and registration tables in connection with the close, register and unregister APIs described herein. As will also be described below, operations of enter gate, exit gate and check gate may be performed in connection with the add_events API to synchronize access between producers updating the event notification lists (reading the registration database and registration tables) and other processing which writes or updates the registration database and tables for the register, unregister and close APIs. The combination of seal/unseal/enter/exit/check gate operations are used to provide a logical gate synchronizing access to the registration database and registration tables between readers and writers of these structures. Additionally, the foregoing gate operations may include other processing to synchronize access to fields of the gate structure which may also be updated and/or read by producers and consumers.

As will be described below, the gate structure may be implemented using a combination of a mutex (to serialize access to the gate lock field) and spinlock (to protect waiter_count and indicate that the lock is held). The gate keeps producers from sending events while events are being registered/unregistered. Also, processing performed in connection with the gate operations described herein provides for waking up any pending producers on any event queue and ensures that a producer doesn't end up blocking a consumer from unregistering an event (at cleanup time or otherwise).

Referring to FIG. 22, shown is an example of logical processing that may be performed in connection with implementing the register_event API. Element 1260 indicates processing performed in connection with the user space version and element 1280 indicates processing performed in connection with the kernel space version. In connection with element 1260, steps 1262 and 1264 describe processing to prepare parameter information for a call which proxies into the kernel where code of the kernel performs processing in accordance with the parameters of the user space close API invocation. Similar to that as described above in connection with other figures, step 1266 uses the RPC API routine rpc_call FAST to proxy into the kernel to perform the necessary processing for the register_event queue API. Step 1268 indicates that control is transferred to kernel space code, the kernel space handler eventq_rpc_callback in this example, which performs processing of steps 1268a and 1268b. As also described in connection with other figures, steps 1268a-b may be performed by part of the larger body of kernel space code of the eventq_rpc_callback although illustrated inline in this example. At step 1268a, the parameter information received on the kernel side by the handler is extracted and passed to the kernel space register_event API. Once control returns to the kernel space handler at step 1268b, the kernel space handler returns from the RPC to user space. At step 1270, control returns to the caller.

In connection with element 1280, seal gate processing is performed at step 1282 which wakes up any producers pending in the add_events kernel API code. Seal gate processing includes then sleeping for a while and then continuing to awaken other producers until all waiting or blocked producers (waiting on P_SEM for the different consumer reference structures associated with this event queue handle structure). At this point, the gate is closed. At step 1284, the registration table for the event in the registration database (associated with the event queue's handle structure) is located if one exists. With reference back to FIG. 10, step 1284 may include determining whether an instance such as 602 exists for the event parameter. At step 1286, if no registration table matching the event parameter is located (no container has previously registered for this event), then the registration table for this event is created. At step 1288, a registration entry is added for this reference to the registration table (e.g., new entry like 602a of FIG. 10). At step 1290, unseal gate processing is performed to reopen the gate and allow producers back in (e.g, to access the structures). At step 1292, control is returned to the caller.

Figure 23:
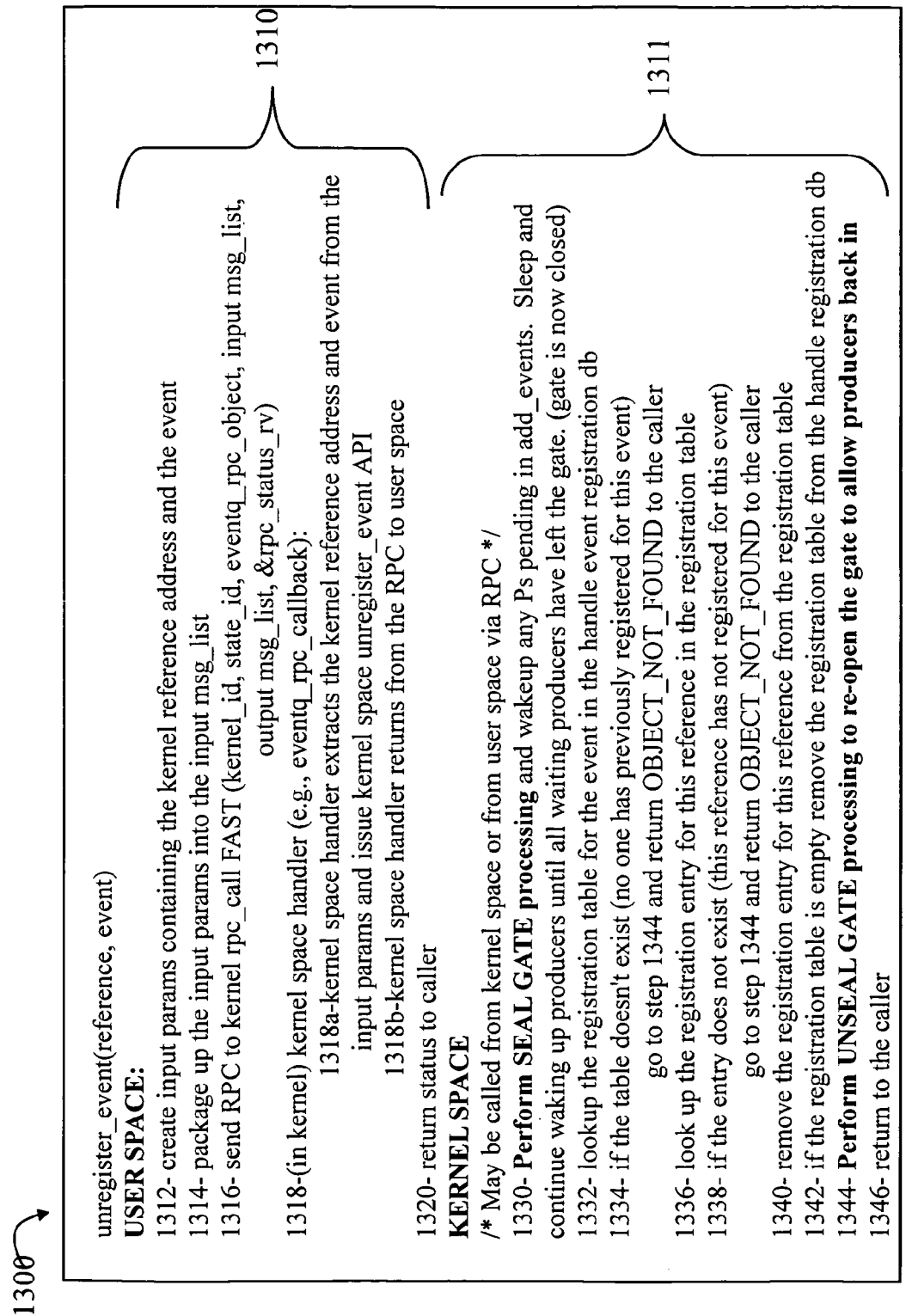

Referring to FIG. 23, shown is an example of logical processing that may be performed in connection with implementing the unregister_event API. Element 1310 indicates processing performed in connection with the user space version and element 1311 indicates processing performed in connection with the kernel space version. In connection with element 1310, steps 1312 and 1314 describe processing to prepare parameter information for a call which proxies into the kernel where code of the kernel performs processing in accordance with the parameters of the user space API invocation. Similar to that as described above in connection with other figures, step 1316 uses the RPC API routine rpc_call FAST to proxy into the kernel to perform the necessary processing for the unregister_event API. Step 1318 indicates that control is transferred to kernel space code, the kernel space handler eventq_rpc_calback in this example, which performs processing of steps 1318a and 1318b. As also described in connection with other figures, steps 1318a-b may be performed by part of the larger body of kernel space code of the eventq_rpc_callback although illustrated inline in this example. At step 1318a, the parameter information received on the kernel side by the handler is extracted and passed to the kernel space unregister_event API. Once control returns to the kernel space handler at step 1318b, the kernel space handler returns from the RPC to user space. At step 1320, control returns to the caller.

In connection with element 1330, seal gate processing is performed at step 1330 which wakes up any producers pending in the add_events kernel API code. Seal gate processing includes then sleeping for a while and then continuing to awaken other producers until all waiting or blocked producers (waiting on P_SEM for the different consumer reference structures associated with this event queue handle structure). At this point, the gate is closed. At step 1332, the registration table for the event in the registration database (associated with the event queue's handle structure) is located if one exists. With reference back to FIG. 10, step 1284 may include determining whether an instance such as 602 exists for the event parameter. At step 1334, if no registration table matching the event parameter is located (no container has previously registered for this event), then an appropriate status is returned to the caller. At step 1340, a corresponding registration entry is removed for this reference from the registration table (e.g., remove appropriate instance of entry like 602a of FIG. 10). At step 1342, if the registration table for this event is empty, the registration table may be removed from the handle registration database. At step 1344, unseal gate processing is performed to reopen the gate and allow producers back in (e.g, to access the structures). At step 1346, control is returned to the caller.

Referring to FIG. 24, shown is an example of logical processing that may be performed in connection with implementing the user space add_events API. Steps 1352, 1354, and 1356 describe processing to prepare parameter information for a call which proxies into the kernel where code of the kernel performs processing in accordance with the parameters of the user space API invocation. Similar to that as described above in connection with other figures, step 1358 uses the RPC API routine rpc_call FAST to proxy into the kernel to perform the necessary processing for the add_events API. Step 1360 indicates that control is transferred to kernel space code, the kernel space handler eventq_rpc_calback in this example, which performs processing of steps 1360a-d. As also described in connection with other figures, steps 1360a-d may be performed by part of the larger body of kernel space code of the eventq_rpc_callback although illustrated inline in this example. At steps 1360a-b, the parameter information received on the kernel side by the handler is extracted and passed in step 1360c to the kernel space add_events API. Once control returns to the kernel space handler at step 1360d, the kernel space handler sets the number of events queued output parameter and returns from the RPC to user space. At step 1362, status and the number of events queued (output parameter or return value) is returned to the caller.

Referring to FIG. 25, shown is an example of logical processing that may be performed in connection with implementing the kernel space add_events API. The steps 1401-1420 are performed for each event being added. In connection with element 1401, enter gate processing is performed which allows the producer to enter the gate if open. Processing for the enter gate, exit gate and check gate processing is described in more detail in subsequent figures and description. At step 1402, the registration table for the event is looked up on the event registration database. Step 1402 may include performing error processing if there are problems encountered with accessing or otherwise locating the appropriate registration table. At step 1403, processing is performed for each entry in the registration table. With reference to 1400, steps 1404-1419 are performed for each entry in the registration table. At step 1404, the P_MUTEX of the reference structure input parameter is taken. This provides for serializing access to the consumer's list of event notifications with respect to other producers. As described elsewhere herein, operations performed in connection with the mutex, P_MUTEX, of the reference structure as well as the semaphores P_SEM and C_SEM may utilize the API as described in the '648 patent application. Steps 1405 and 1406 relate to processing to determine the number of free slots in the ring buffer (event notification list). At step 1407, if there are not free slots and the qfull policy indicates to overwrite either the oldest or newest entry in the ring buffer, then discard the oldest or newest entry accordingly. At step 1408, if there are no free slots and the qfull policy is pending, the steps of 1424 are performed. Element 1424 includes:

- step 1409: performing check gate processing to see if the gate has been closed while processing the event.
- step 1410: if the gate has been closed, the P_MUTEX (producer mutex of the reference structure) acquired in step 1404 is released and control proceeds to step 1404.
- step 1411: wait on the P_SEM of the reference for the consumer container to consume an event notification and make available an entry in the ring buffer.
- step 1412: if the wait was interrupted, the P_MUTEX is dropped and control proceeds to step 1420 and 1421 to return with an appropriate status. The wait may be interrupted in step 1412 if the U space process for which this kernel proxy is being performed terminates.
- step 1413: return to step 1405.

At step 1414, a determination is made as to whether there are free slots, and if so, processing of 1426 is performed. Element 1426 includes:

- step 1414a: copy the event to the first free slot in the ring buffer, and copy the private data (if any) to the first free location in the private data region.
- step 1415: update the P index in the local copy of position information
- step 1416: use the CAS to try and update the position information for the current consumer (e.g., position information of the ring buffer structure pointed to by the reference structure parameter)
- step 1417: if the CAS failed, restart (go to step 1401)
- step 1418: if an event was just added to a previously empty queue, then signal any consumer container waiting on the C_SEM (e.g. wake up reference->C_SEM)

At step 1419, the P_MUTEX for the current reference of the consumer is unlocked or dropped. Once all entries in the registration table for the current event have been processed, control proceeds to step 1420 where exit gate processing is performed. Once all events have been processed, control proceeds to step 1421 to return the number of events processed to the caller.

In connection with a qfull_policy of pending, if there are multiple consumers of an event because one of consumers has a full event notification queue (ring buffer is full), the producer is blocked and waits on the current consumer's (reference structure's) P_SEM semaphore. This stops the other subsequent consumers from receiving notification from the producer. In other words, the producer is blocked or waits on the current consumer until the current consumer makes space available in its ring buffer used for event notification. When an entry in the ring buffer becomes available, processing described herein awakens and unblocks the producer waiting on P_SEM so that the producer resumes with notification posting to the current and remaining registered consumers.

Referring to FIG. 26, shown is an example of logical processing that may be performed in connection with implementing the user space get_events API. At step 1460, a determination is made as to whether the event notification queue (ring buffer and private data area) is allocated from standard or non-shared memory. If so, processing of 1463a is performed indicating processing for an unoptimized case. If the event notification queue is allocated from shared memory, processing of 1463b is performed. Element 1463a includes steps 1462-1470d as will be described. Steps 1462, 1464, and 1466 describe processing to prepare parameter information for a call which proxies into the kernel where code of the kernel performs processing in accordance with the parameters of the user space API invocation. Similar to that as described above in connection with other figures, step 1468 uses the RPC API routine rpc_call FAST to proxy into the kernel to perform the necessary processing for the get_events API. Step 1470 indicates that control is transferred to kernel space code, the kernel space handler eventq_rpc_calback in this example, which performs processing of steps 1470a-d. As also described in connection with other figures, steps 1470a-d may be performed by part of the larger body of kernel space code of the eventq_rpc_callback although illustrated inline in this example. At step 1470a, the parameter information received on the kernel side by the handler is extracted and passed in step to the kernel space get_events API. Once control returns to the kernel space handler, steps 1470b-c, the kernel space handler sets the output parameters and returns from the RPC to user space.

Element 1463b includes steps 1482-1499 as will be described. At step 1482, two copies of the position information for the current ring buffer are made. The two copies are used with the CAS instruction in subsequent steps where one copy is updated and the second copy is preserved as an original. In step 1486, the number of used slots in the ring buffer is determined. At step 1488, a determination is made as to whether there are any event notifications in the ring buffer. If not, step 1488 uses the RPC API (e.g., rpc_call FAST) to proxy into the kernel and wait on the C_SEM for the reference structure. Step 1488 may include performing an RPC to proxy into the kernel to the eventq_rpc_callback as described elsewhere herein. The input parameters in connection with the rpc_call FAST to the eventq_rpc_callback may include a tag in a message list indicating the appropriate command code for the operation to wait on the semaphore. The input parameters may also identify the C_SEM semaphore as the semaphore for which the wait operation is performed.

At step 1490, for each event, processing is performed to post the event in the ring buffer and associated private data area. At step 1492, the local copy of Cindex (consumer index of the position information) is updated to reflect the number of events consumed. At step 1494, the CAS operation may be used to update the position information included in the ring buffer structure indices using the local copy and the original position information. At step 1496, a determination is made as to whether the indices (consumer and producer indices of the position information) have changed while the events were being consumed. If so, step 1496 indicates that processing proceeds to step 1480. At step 1498, a determination is made as to whether the queue was full prior to consuming event notifications. If so, step 1498 performs processing to proxy into the kernel using the RPC API (e.g., call to rpc_call FAST) to awaken a waiting producer (if any) on the P_SEM of the reference structure. Step 1498 may include performing an RPC to proxy into the kernel to the eventq_rpc_callback as described elsewhere herein. The input parameters in connection with the rpc_call FAST to the eventq_rpc_callback may include a tag in a message list indicating the appropriate command code for the operation to awaken a producer that may be waiting on the semaphore. The input parameters may also identify the P_SEM semaphore as the semaphore for which the operation is performed. At step 1499, the number of events (num_events_rv) is set in accordance with the number of events consumed and control returns to the caller.

In connection with the user space version of the get_events API, implementing the ring buffer and any private data using shared memory may be characterized as an optimized version of this routine in contrast to not using shared memory for the foregoing. In the code of 1463*b*, the consumer container does not have to proxy into the kernel to retrieve the posted event notifications and any associated private data. Rather, since these are stored in shared memory, the consumer container is able to directly access this information as in connection with step 1490. As a result in connection with step 1463*b*, the consumer only needs to proxy into the kernel at step 1488 and 1498 if needed. In contrast in connection with 1463*a* for the unoptimized case, the consumer container performs processing to proxy into the kernel to retrieve any event notifications and associated private data.

It should be noted that step 1496 checks to see if additional event notifications were posted while retrieving event notifications. If so, processing proceeds to step 1480 to restart processing which retrieves posted notifications including any newly posted event notifications (which have been posted since previous execution of step 1480).

Referring to FIG. 27, shown is an example of logical processing that may be performed in connection with implementing the kernel space get_events API. At step 1502, two copies of the position information for the current ring buffer are made. The two copies are used with the CAS instruction in subsequent steps where one copy is updated and the second copy is preserved as an original. In step 1504, the number of used slots in the ring buffer is determined. At step 1506, a determination is made as to whether there are any event notifications in the ring buffer. If not, step 1506 waits on the C_SEM for the reference structure. Step 1506 may include using the appropriate API as described in the '648 patent application for semaphore operations. At step 1508, for each event, processing is performed to post the event in the ring buffer and associated private data area. At step 1510, the local copy of Cindex (consumer index of the position information) is updated to reflect the number of events consumed. At step 1512, the CAS operation may be used to update the position information included in the ring buffer structure indices using the local copy and the original position information. At step 1514, a determination is made as to whether the indices (consumer and producer indices of the position information) have changed while the events were being consumed. If so, step 1514 indicates that processing proceeds to step 1502. At step 1516, a determination is made as to whether the queue was full prior to consuming event notifications. If so, step 1516 performs processing to awaken a waiting producer (if any) on the P_SEM semaphore of the reference structure. Step 1516, as well as other operations on semaphores herein, may be performed using the appropriate API as described in the '648 patent application. At step 1518, the number of events (num_events_rv) is set in accordance with the number of events consumed and control returns to the caller.

It should be noted that step 1514 checks to see if additional event notifications were posted while retrieving event notifications. If so, processing proceeds to step 1502 to restart processing which retrieves posted notifications including any newly posted event notifications (which have been posted since previous execution of step 1480).

In connection with techniques herein, multiple producers can use the same event queue reference structure for event notification or posting to consumers of an event queue. For example, two threads in a same producer container can use the same reference structure created with a single open API invocation. It should be noted that two consumer threads in a same container may not use the same reference structure without additional synchronization between the threads. In other words, an embodiment in accordance with the techniques herein may include code in which two consumer threads of a same container use the same reference structure if additional synchronization is provided to synchronize processing of the two consumer threads with respect to the reference structure used by both threads. Otherwise, the API as described herein assumes that each thread in a container which consumes events will utilize its own reference structure. In contrast, a same reference structure may be used, for example, by multiple producers in a same container, or by a producer and a consumer in a same container with the API herein without additional synchronization.

In connection with the get_events API, a time out value may be specified indicating a maximum amount of time a consumer will wait for event notification should the consumer's reference be associated with an empty ring buffer at the time the consumer container issues the get_events API call.

What will now be described is the gate lock structure and associated operations (seal/unseal/enter/exit/check) as mentioned above.

Figure 28:
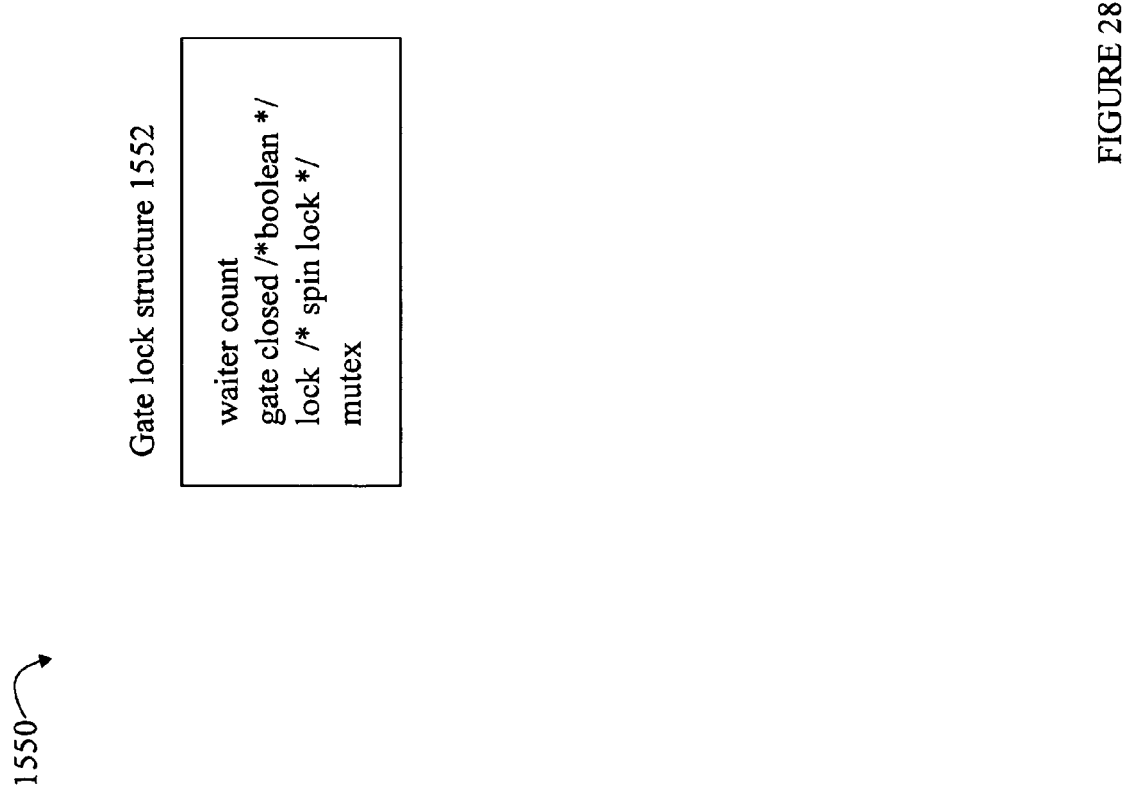
FIG. 28 is an example illustrating fields that may be included in a gate structure in an embodiment in accordance with techniques herein.

Referring to FIG. 28, shown is an example 1550 illustrating a gate lock structure and fields therein. The gate lock structure 1552 may be included in each instance of the event queue handle structure. In particular with reference to FIG. 9, the example 1550 illustrated in more detail an instance of the gate 560. The gate lock structure may include a waiter count, gate closed boolean, lock, and mutex. Usage of the fields of 1552 is described in following paragraphs and figures. The waiter count field may be an integer quantity indicating a number of producers inside the logical gate. Each of the producers may or may not be waiting (e.g., a producer inside the gate may be, for example, posting event notifications, waiting for a free entry in the ring buffer (event notification list) and the like). The gate closed boolean, lock, and mutex data items may be used to control synchronization as described in subsequent operations. In one embodiment, the lock field may be implemented using a native spin lock primitive and using the appropriate APIs as described in the '648 patent application. The mutex may be implemented using the appropriate APIs as described in the 648 patent application.

Figure 29:
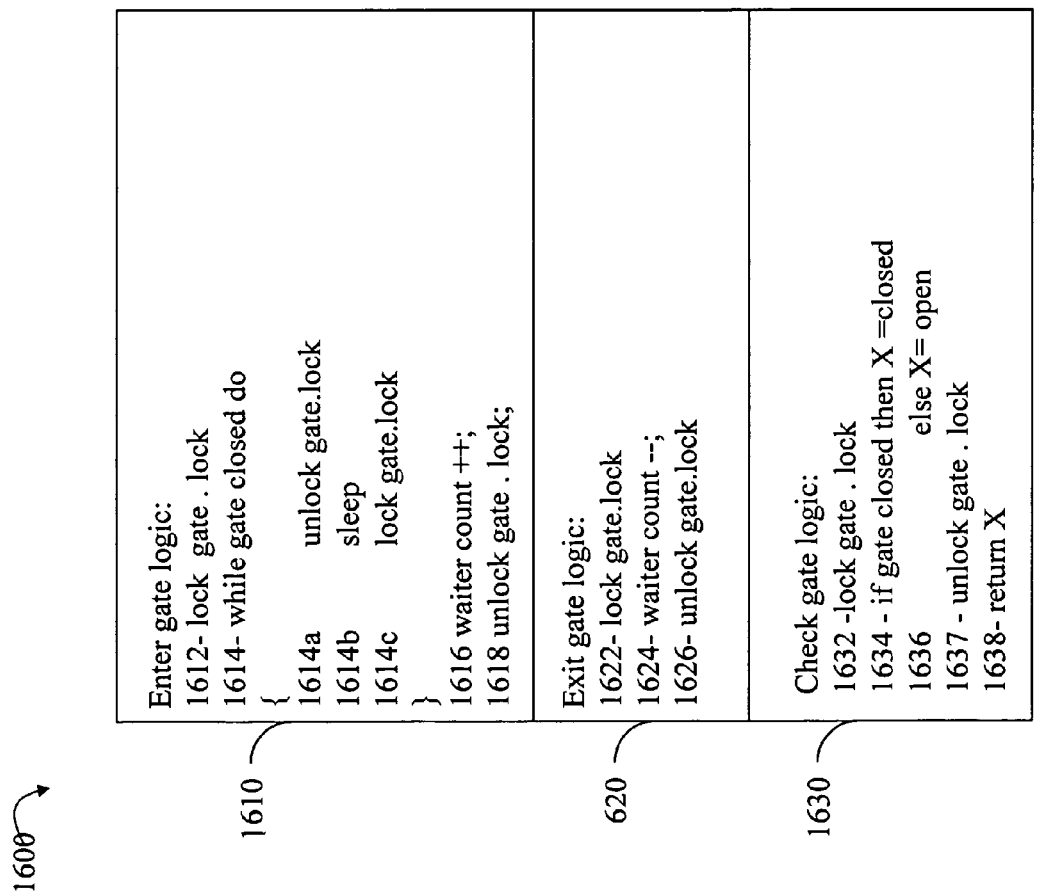
FIGS. 29 and 30 described processing of different gate operations that may be performed in an embodiment in accordance with techniques herein.

Referring to FIG. 29, shown is an example of processing that may be performed for the enter gate, exit gate and check gate operations. Element 1610 indicates processing for the enter gate processing. Element 1610 includes step 1612 where gate.lock is locked. At step 1614, a while loop is performed while the gate closed field of the gate structure is true. Step 1614 includes the following:

step 1614*a*: unlock gate.lock
step 1614*b*: sleep
step 1614*c*: lock gate.lock where the executing container loops until the boolean gate closed is false indicating that the gate is open. At step 1616, the waiter count is incremented. In step 1618, gate.lock is unlocked. The lock field of the gate structure is used to control access to the waiter count and gate closed fields of the gate structure.

Element 1620 indicates processing for the exit gate processing. At step 1622, gate.lock is locked and the waiter count is decremented in step 1624. At step 1626, gate.lock is unlocked. Element 1630 indicates processing for the check gate processing. At step 1632, gate.lock is locked. At step 1634, a determination is made as to whether gate.gate closed is true. If so (indicating that the gate is closed), X is set to closed which will be returned in step 1638. Otherwise, if the gate is open, X is set to open. In step 1637, gate. lock is unlocked and the appropriate value as indicated by the variable X is returned in step 1638.

As described above, the operations of FIG. 29 may be performed with the add events API.

Figure 30:
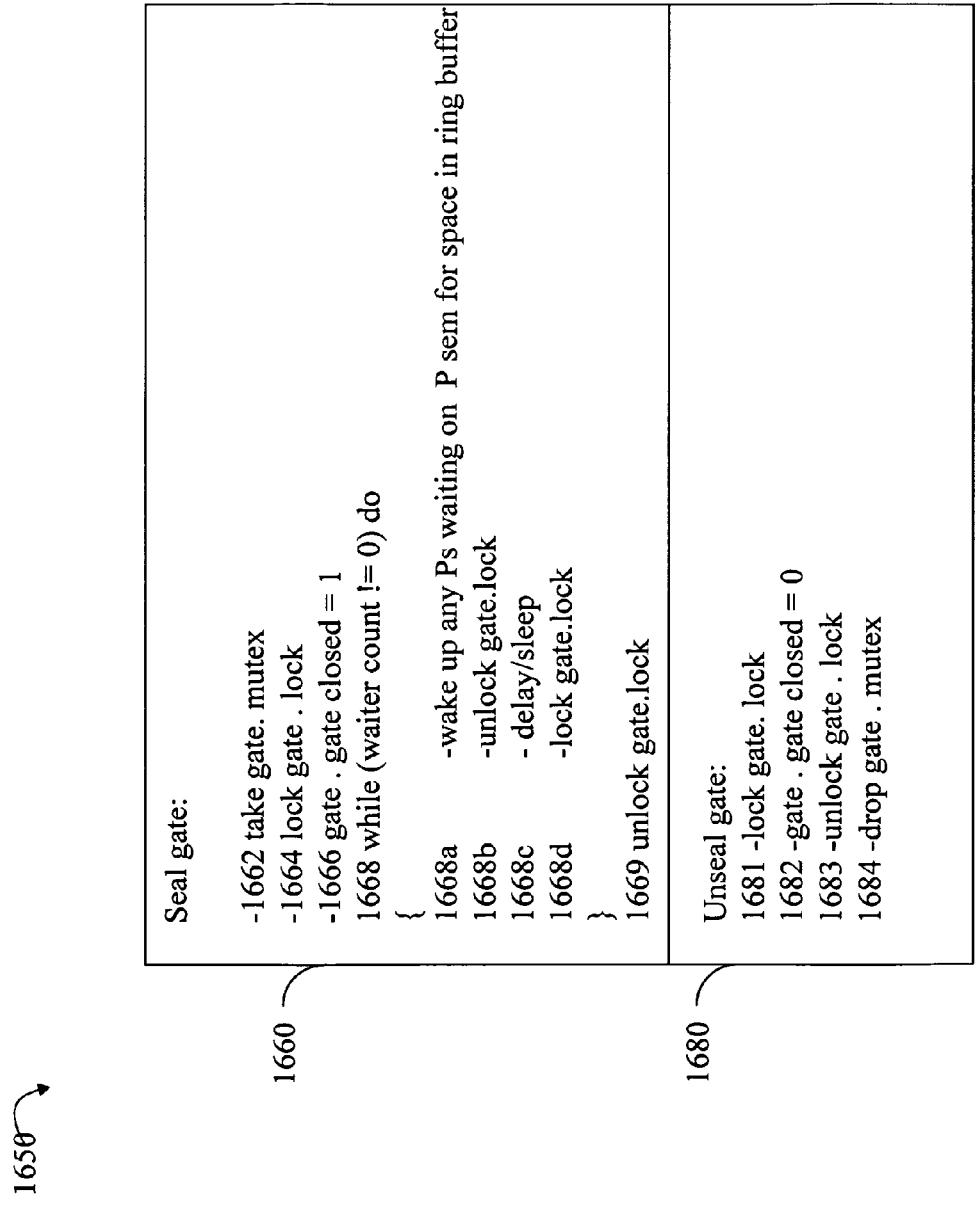

Referring to FIG. 30, shown is an example of processing that may be performed for the seal and unseal gate operations. Element 1660 indicates processing for the seal gate processing and element 1680 indicates processing for the unseal gate processing. In connection with element 1660, step 1662 takes the gate. mutex. At step 1664, gate.lock is locked. At step 1666, gate.closed=1 indicating that the gate is closed. Step 1668 performs processing to wake up any waiting producers waiting on (e.g., blocked on) P_SEM of a consumer's reference structure. Step 1668 includes steps 1668a-d as illustrated. At step 1669, gate.lock is unlocked.

In connection with element 1680, step 1681 locks gate.lock. Step 1682 sets get.gate closed=0, Step 1683 unlocks gate.lock. Step 1684, drops or releases the gate.mutex.

As described above, the operations of FIG. 30 may be performed with the register_events, unregister events, and close APIs.

The gate structure used herein is down or closed (as indicated by the gate closed boolean of the gate structure of FIG. 28) when event registration information (such as of the event registration database and associated tables) is being modified. When any producer is inside the gate (e.g. per enter gate logic 1610 of FIG. 27), processing is performed to ensure that there is no reconfiguration for event registration/unregistration (e.g., no reconfiguration of event registration information for the event queue). In other words, when a producer is inside the gate (e.g., step 1401 of FIG. 25), no container can register or unregister for an event. Also, processing for the close API is not allowed to modify the structures indicating event registration. The waiter count of the gate structure indicates the number of producers currently inside the gate. The register, unregister and close APIs close the gate (e.g., gate closed=true). When the gate is closed, processing as described herein will not let any additional producers inside the gate, allows existing currently executing producers which are not blocked to continue posting event notifications, and wakes up any producers inside the gate waiting for a free entry on a consumer's ring buffer. Waking up such producers effectively forces the producers outside the gate so that they cannot reenter to continue waiting until the gate is reopened (e.g., gate closed=false). In connection with register, unregister and close APIs which use the seal and unseal operations to synchronize access to the structures herein, processing may be represented as follows:

gate down or closed /*seal operation*/
awaken any waiting producers currently inside the gate
perform reconfiguration with respect to register/unregister modifications to the registration database and associate registration tables
gate up or open /*unseal operation*/

Any container trying to reenter the gate or gain access (e.g., via enter gate logic) will sleep and periodically check whether the gate has been reopened using the unseal operation. It should be noted that a container may also wait in connection seal operation processing when trying to obtain gate mutex (step 1662 of FIG. 30). When the gate is closed via the seal operation, no reconfiguration of the registration information may be performed by an entity other than the entity that performed the seal operation. Additionally, when the gate is closed, no additional threads are allowed inside the gate (to read or write event registration configuration information). As described herein, reconfiguration of registration information may be performed by the register, unregister and close event queue APIs described herein which modify information indicating what consumers are registered for what events. Referring back to FIGS. 9 and 10, when the gate is closed via the seal gate operation, only the entity performing the seal gate operation is allowed to modify the registration database including the registration tables and associated entries (identifying which consumers are registered for events). Additionally, threads which need to read the registration database and associated registration tables and which are outside the logical gate when closed are also not allowed to access (for reading) the event registration configuration information. It should be noted that the foregoing exclusive access to configuration information for event registration is provided per event queue (e.g., per entry on the global list of FIG. 9).

The event queue API described herein may be used in a variety of different ways of producer-consumer inter-container communication and notification regarding events. A single event queue may be associated with a selected group of one or more producers and one or more consumers. For example, producer and consumer containers may utilize a first event queue for first set of defined events. The same, or different containers may utilize a second different event queue for a second set of defined events. For example, a first event queue may be used to communicate event notifications regarding container creation and termination. A second event queue may be used to communicate event notifications regarding certain files such as when one or more files are opened, closed, and the like.

The techniques described herein provide for cleanup processing as described above. For example, when the reference count (ref count 558 of FIG. 9) of the handle structure associated with an event queue reaches 0 indicating there are no users of the event queue, resources associated with the event queue may be made available for other uses (e.g., the handle structure may be deallocated). As described herein, processing may be performed to manage the reference count by incrementing the reference count with each open and create API call and accordingly decrementing the reference count on each close and destroy API call for the event queue handle structure.

Figure 31:
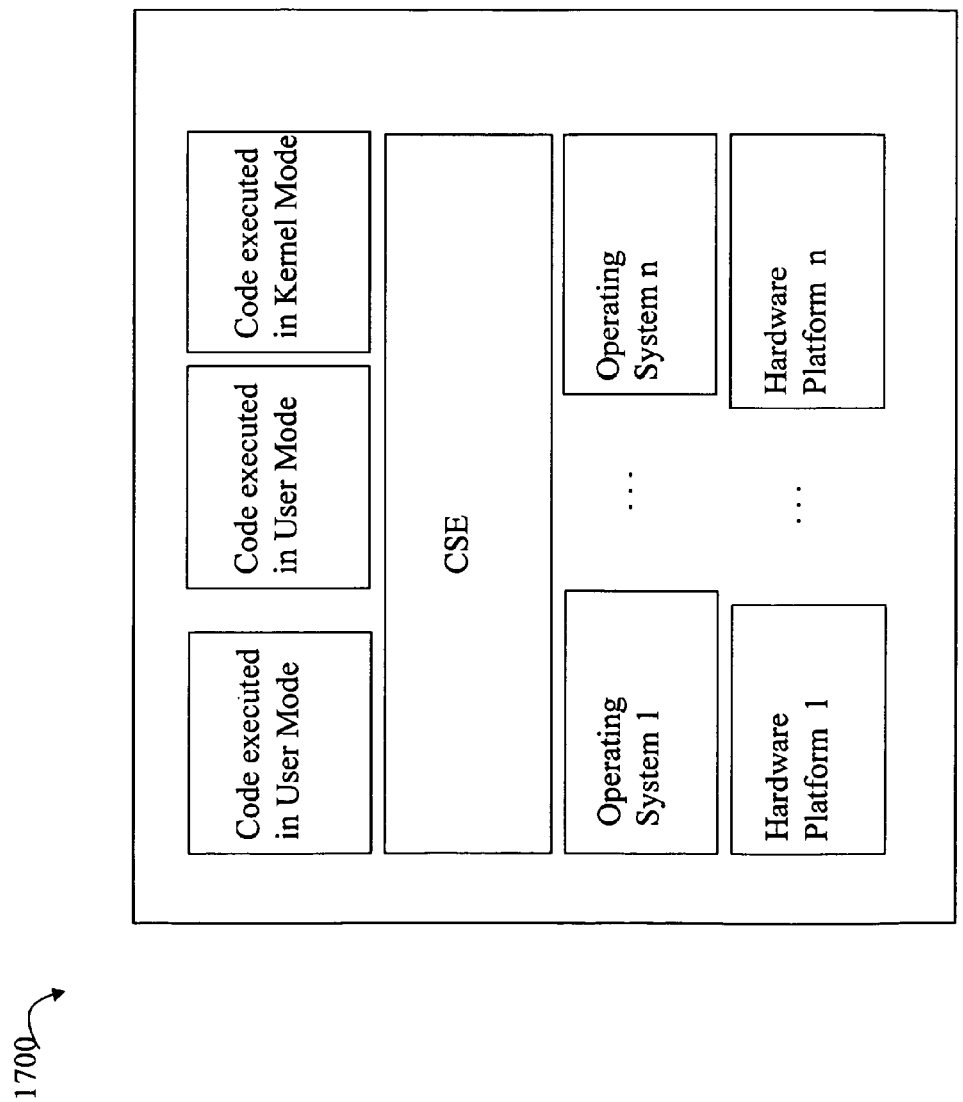
FIG. 31 is an illustration of the different operating systems and hardware platforms that may be included on a data storage system for use with the techniques herein.

Referring now to FIG. 31, shown is a representation illustrating the relationship of the common software environment (CSE) components to other components of the data storage system. In the example 1700, the CSE includes the API, and other infrastructure code used to interface code of the API to other operating system components. The CSE may isolate any code in user space (code executing in user mode) or kernel space (code executing in kernel mode) above the CSE from dependencies in the operating system or hardware platform. Furthermore, code written using the API of the CSE may be executed in either user or kernel mode as illustrated herein.

As will be appreciated by those skilled in the art, the techniques herein may be used for existing code as well as newly developed code. For existing code, the platform specific calls may be determined and replaced with appropriate API calls. The API code may be modified to provided the necessary support for any additional platform. Similarly, new code may be developed using the API calls which may utilize the platform specific primitives while isolating the code from these platform dependencies.

It should be noted that a code module making calls into the API in accordance with techniques herein may use a first version of the API code when executing in user mode and a second version of the API code when executing in kernel mode by linking to the appropriate version. In other words, the code module makes the same API call (e.g., same defined interface) when executing in user mode and kernel mode so that the same code module can be executed in user mode and kernel mode without modification. However, the body of code included in the API which is executed as a result of the API call may vary in accordance with whether executing in user mode or kernel mode.

Although the techniques herein are illustrated in an exemplary embodiment of a data storage system, the techniques herein may be used in connection with code executing on any computer processor on any system.

It should be noted that other operations such as in connection with semaphores (e.g., P_SEM and C_SEM of FIG. 11) and mutexes (e.g., P_MUTEX of FIG. 11) may be implemented using APIs providing code portability and used from either user space or kernel space. One exemplary API that may be used in an embodiment in accordance with techniques herein is described in the '648 patent application.

It should also be noted that the ring buffer as described herein may be used in an embodiment as the event notification list. The techniques described herein for accessing the ring buffer and performing operations thereon in connection with posting (e.g., adding) and retrieving event notifications therefrom may be characterized as an adaption of the techniques described in the '759 and '822 applications for the FIFO structure described herein.

As described herein, an event registration configuration change or event registration reconfiguration may refer to modification of event registration information such as of the registration database and registration tables identifying which consumers are registered for which events. In accordance with an embodiment of the event queue API described herein, event registration reconfiguration may occur in connection with processing performed by API code for the register, unregister and close APIs.

In accordance with the techniques described herein, a container may include more than one producer thread or other code execution entity. For example, two producer threads may be included in a same container. Each of the producer threads may produce notifications in connection with the same events and/or different events. The foregoing two producer threads in the same container may use the same reference structure for posting event notifications. Thus, a reference structure with respect to producers may be used by one or more producers (different code execution entities producing events) in the same container.

Also in accordance with the techniques described herein, a container may include more than one consumer thread. For example, a container may include two consumer threads where each of the foregoing two threads uses a different reference structure. Alternatively, an embodiment using the API herein may provide for the two consumer threads using the same reference structure with additional synchronization (in addition to the event queue API) between the two consumer threads providing serialized or exclusive access to the reference structure used by both consumer threads.

Yet further in accordance with techniques herein, a container may include one or more threads which are consumers and one or more threads which are producers. A single thread in a container may be both a consumer and a producer and the single thread may use one or more reference structures.

It should be noted that examples described herein may have been provided with respect to a single event queue and that producers and consumers may use more than one event queue for communicating between producers and consumers thereof. Additionally, techniques herein may be used for communicating between one or more producers and one or more consumers in different containers as well as within the same container. For example, the techniques herein may be used to facilitate communications between a producer thread in a first container and a consumer thread in a second different container. Additionally, the techniques herein may also be used to facilitate communications between a producer thread in a first container and a consumer thread also in the same first container. Thus, techniques herein may be used for communications between one or more producers and one or more consumers included in the same and/or different containers.

An embodiment may implement the techniques herein using code executed by a computer processor. For example, an embodiment may implement the techniques herein using code which is executed by a processor of the data storage system. As will be appreciated by those skilled in the art, the code may be stored on the data storage system on any one of a computer-readable medium having any one of a variety of different forms including volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a data storage system processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for communicating between one or more producers and one or more consumers comprising:
registering, by a first consumer of an event queue, for notification regarding occurrences of one or more events;
posting, by a producer of the event queue, notification to a plurality of consumers of the event queue regarding one or more occurrences of one or more events, each of said plurality of consumers receiving notification regarding occurrences of events for which said each consumer is registered on a corresponding one of a plurality of event notification lists, said plurality of consumers including said first consumer, said posting including posting a first event notification to said plurality of event notification lists in accordance with a pending policy whereby processing of said producer is blocked if any of the plurality of event notification lists do not have a free entry to post the first event notification, said posting further including:
posting, by said producer, said first event notification to a portion of said plurality of event notification lists; and
blocking execution of said producer because an event notification list of the first consumer does not have a free entry to post the event notification, wherein said blocking blocks said producer from posting the first event notification to the event notification list and any other remaining ones of the plurality of event notification lists not included in the portion; and
retrieving, by said first consumer, posted event notifications regarding events for which said first consumer is registered, wherein, if said first consumer is executing in user space and said event notification list of said plurality of event notification lists to which said event notifications for said first consumer are posted is located in shared memory, said first consumer retrieves said posted event notifications without proxying into kernel space, and wherein if said event notification list of said first consumer is not located in shared memory, said first consumer proxies into kernel space to retrieve said posted event notifications from said event notification list.

2. The method of claim 1, wherein posting a notification regarding an occurrence of an event includes posting an event notification to an entry in said event notification list and posting additional data to a private data area, said private data area being located in shared memory if said event notification list is included in shared memory.

3. The method of claim 1, wherein said producer uses a first application programming interface to create a first reference structure to said event queue, and said first consumer uses said first application programming interface to create a second reference structure to said event queue.

4. The method of claim 3, wherein said first consumer uses a second application programming interface to perfoun said registering, each invocation of said second application programming interface by said first consumer identifying said second reference structure, and wherein said first consumer uses a third programming interface to perfoi La said retrieving, each invocation of said third programming interface by said first consumer identifying said second reference structure.

5. The method of claim 3, wherein said producer uses a second application programming interface to perform said posting, each invocation of said second application programming interface by said producer identifying said first reference structure.

6. The method of claim 4, wherein said producer is also a consumer of one or more events for which said producer has registered using said second application programming interface, wherein each invocation of said second application programming interface by said producer identifies said first reference structure.

7. The method of claim 1, wherein an application programming interface is invoked by code of a container other than said producer and said one or more consumers to create said event queue.

8. The method of claim 1, wherein said registering, said posting and said retrieving are performed using defined interfaces, said defined interfaces used when said producer executes in user space and said first consumer executes in user space, when said producer executes in user space and said first consumer executes in kernel space, and when said producer executes in kernel space and said first consumer executes in user space.

9. The method of claim 1, wherein said event queue is associated with a registration database of registered events for which consumers are registered, wherein processing performed to modify said registration database includes performing processing to close a logical gate, awakening all waiting producers of said event queue waiting for a free entry in any notification list of any consumer of said event queue, modifying said registration database, and opening said logical gate.

10. The method of claim 9, wherein processing performed by said producer in connection with said posting of an event notification for a first event to said event notification list of said first consumer includes:
reading information from said registration database when said producer determines that said logical gate is opened, said information indicating that said first consumer is registered to receive notifications regarding said first event;
acquiring a mutex to synchronize access to said first consumer's event notification list with other producers; and
if there are no free entries in said first consumer's event notification list and said producer is trying to post an event notification to a free entry in said first consumer's event notification list, said producer determines whether the gate is closed, and if the gate is closed, the producer releases said mutex and resumes processing when said gate is opened, and if the gate is open, said producer blocks waiting for a free entry in said first consumer's event notification list.

11. The method of claim 10, wherein an application programming interface includes a first defined interface for use by a consumer to perform said registering, a second defined interface for use by a consumer to unregister for a specified event, and a third defined interface used by producers and consumers of said event queue to indicate that an invoking container is ending use of said event queue for communications with other containers which have opened said event queue for communications using a fourth defined interface, and wherein code of routines for said first defined interface, said second defined interface and said third defined interface modify said registration database.

12. The method of claim 11, wherein said application programming interface includes a fifth defined interface used by a producer to perform said posting.

13. The method of claim 12, wherein said fifth defined interface includes a parameter indicating a policy utilized in connection with posting an event notification to a consumer's event notification list when the consumer's event notification list is full, said parameter indicating one of a plurality of policies, said plurality of policies including said pending policy, overwrite oldest, and overwrite newest, wherein said pending policy causes processing of a posting producer to wait until an entry in the consumer's event notification list is free, said overwrite oldest causes a posting producer to overwrite an oldest entry in the consumer's event notification list when full, and said overwrite newest causes a posting producer to overwrite a newest entry in the consumer's event notification list when full.

14. The method of claim 1, wherein a defined interface is used by said first consumer to perform said retrieving, said defined interface including a parameter indicating a timeout value, wherein, if said event notification list of said first consumer is empty, said timeout value specifies an amount of time said first consumer waits for an event notification to be posted to said event notification list prior to said first consumer continuing processing.

15. A non-transitory computer readable medium comprising code stored thereon for communicating between one or more producers and one or more consumers, the non-transitory computer readable medium comprising code for:
registering, by a first consumer of an event queue, for notification regarding occurrences of one or more events;
posting, by a producer of the event queue, notification to a plurality of consumers of the event queue regarding one or more occurrences of one or more events, each of said plurality of consumers receiving notification regarding occurrences of events for which said each consumer is registered on a corresponding one of a plurality of event notification lists, said plurality of consumers including said first consumer, said posting including posting a first event notification to said plurality of event notification lists in accordance with a pending policy whereby processing of said producer is blocked if any of the plurality of event notification lists do not have a free entry to post the first event notification, said posting further including:
   posting, by said producer, said first event notification to a portion of said plurality of event notification lists; and
   blocking execution of said producer because an event notification list of the first consumer does not have a free entry to post the event notification, wherein said blocking blocks said producer from posting the first event notification to the event notification list and any other remaining ones of the plurality of event notification lists not included in the portion; and
   retrieving, by said first consumer, posted event notifications regarding events for which said first consumer is registered, wherein, if said first consumer is executing in user space and said event notification list of said plurality of event notification lists to which said event notifications for said first consumer are posted is located in shared memory, said first consumer retrieves said posted event notifications without proxying into kernel space, and wherein if said event notification list of said first consumer is not located in shared memory, said first consumer proxies into kernel space to retrieve said posted event notifications from said event notification list.

16. The non-transitory computer readable medium of claim 15, wherein posting a notification regarding an occurrence of an event includes posting an event notification to an entry in said event notification list and posting additional data to a private data area, said private data area being located in shared memory if said event notification list is included in shared memory.

17. The non-transitory computer readable medium of claim 15, wherein said producer uses a first application programming interface to create a first reference structure to said event queue, and said first consumer uses said first application programming interface to create a second reference structure to said event queue.

18. The non-transitory computer readable medium of claim 17, wherein said first consumer uses a second application programming interface to perform said registering, each invocation of said second application programming interface by said first consumer identifying said second reference structure, and wherein said first consumer uses a third programming interface to perform said retrieving, each invocation of said third programming interface by said first consumer identifying said second reference structure.

19. The non-transitory computer readable medium of claim 15, wherein the event notification list is implemented using a ring buffer.

20. The non-transitory computer readable medium of claim 15, wherein the event queue is used by different containers for communicating therebetween, each of said different containers executing in a context of its own address space that is different from address spaces of other containers.

* * * * *